(12) United States Patent
O'Dowd et al.

(10) Patent No.: US 11,865,613 B2
(45) Date of Patent: Jan. 9, 2024

(54) STRUCTURED LIGHT PART QUALITY MONITORING FOR ADDITIVE MANUFACTURING AND METHODS OF USE

(71) Applicant: Additive Monitoring Systems, LLC, San Diego, CA (US)

(72) Inventors: Niall O'Dowd, Chicago, IL (US); Christopher John Sutcliffe, Liverpool (GB)

(73) Assignee: Additive Monitoring Systems, LLC, San Diego, CA (US)

( * ) Notice: Subject to any disclaimer, the term of this patent is extended or adjusted under 35 U.S.C. 154(b) by 0 days.

(21) Appl. No.: 18/299,508

(22) Filed: Apr. 12, 2023

(65) Prior Publication Data

US 2023/0249253 A1    Aug. 10, 2023

Related U.S. Application Data

(63) Continuation of application No. PCT/US2022/045648, filed on Oct. 4, 2022.

(60) Provisional application No. 63/374,452, filed on Sep. 2, 2022, provisional application No. 63/253,271, filed on Oct. 7, 2021.

(51) Int. Cl.
| | | |
|---|---|---|
| *B22F 10/30* | (2021.01) | |
| *B22F 10/80* | (2021.01) | |
| *B33Y 40/00* | (2020.01) | |
| *B33Y 50/00* | (2015.01) | |

(52) U.S. Cl.
CPC .............. *B22F 10/30* (2021.01); *B22F 10/80* (2021.01); *B33Y 40/00* (2014.12); *B33Y 50/00* (2014.12)

(58) Field of Classification Search
CPC .......... B22F 10/30; B22F 10/80; B33Y 40/00; B33Y 50/00
USPC ............................................................ 700/98
See application file for complete search history.

(56) References Cited

U.S. PATENT DOCUMENTS

| | | | |
|---|---|---|---|
| 7,706,910 | B2 | 4/2010 | Hull et al. |
| 8,003,040 | B2 | 8/2011 | El-Siblani |
| 8,693,007 | B2 | 4/2014 | Ishigaki |
| 9,058,533 | B2 * | 6/2015 | Fedorovskaya .. G06K 19/06159 |
| 9,116,504 | B2 | 8/2015 | Kurashige et al. |
| 9,415,544 | B2 | 8/2016 | Kerekes et al. |
| 9,643,357 | B2 | 5/2017 | Farah et al. |
| 9,855,698 | B2 | 1/2018 | Perez et al. |
| 10,124,410 | B2 | 11/2018 | Kanko et al. |
| 10,252,335 | B2 | 4/2019 | Buller et al. |
| 10,302,419 | B2 | 5/2019 | Goodwin |

(Continued)

FOREIGN PATENT DOCUMENTS

| | | |
|---|---|---|
| EP | 3208077 A1 | 8/2017 |
| EP | 3762218 A1 | 1/2021 |

(Continued)

OTHER PUBLICATIONS

WIPO International Searching Authority/USPTO, International Search Report and Written Opinion issued in corresponding application, PCT/US2022/045648, dated Feb. 22, 2023, 13 pages.

(Continued)

*Primary Examiner* — Michael J Brown
(74) *Attorney, Agent, or Firm* — J. Peter Paredes; Amin Talati Wasserman LLP

(57) ABSTRACT

Provided herein are systems, methods, and apparatuses for Structured Light Part Quality Monitoring for Additive Manufacturing.

14 Claims, 40 Drawing Sheets

(56) References Cited

U.S. PATENT DOCUMENTS

| | | |
|---|---|---|
| 10,495,438 B2 | 12/2019 | Ishigaki et al. |
| 10,563,978 B2 | 2/2020 | Lee et al. |
| 10,611,092 B2 | 4/2020 | Buller et al. |
| 10,639,721 B2 | 5/2020 | Das et al. |
| 10,704,888 B2 | 7/2020 | Ishigaki et al. |
| 10,723,139 B2 | 7/2020 | Mattes et al. |
| 10,782,122 B2 | 9/2020 | Ishigaki et al. |
| 10,933,588 B2 | 3/2021 | Adzima |
| 2015/0213606 A1 | 7/2015 | Akopyan et al. |
| 2017/0023499 A1* | 1/2017 | Mitchell ................. B22F 10/28 |
| 2018/0099333 A1 | 4/2018 | DehghanNiri et al. |
| 2018/0268616 A1* | 9/2018 | Choi ...................... B33Y 30/00 |
| 2018/0272613 A1 | 9/2018 | Cieszynski et al. |
| 2019/0219379 A1 | 7/2019 | Ishigaki et al. |
| 2019/0381736 A1 | 12/2019 | Jensen et al. |
| 2019/0389130 A1 | 12/2019 | Richardson et al. |
| 2020/0160497 A1 | 5/2020 | Shah et al. |
| 2020/0180023 A1 | 6/2020 | Narita et al. |
| 2021/0060855 A1 | 3/2021 | Bendjus et al. |
| 2021/0078076 A1 | 3/2021 | Jurg et al. |
| 2021/0183085 A1 | 6/2021 | Pau et al. |
| 2023/0004142 A1* | 1/2023 | Cetinkaya ........ G05B 19/41875 |

FOREIGN PATENT DOCUMENTS

| | | |
|---|---|---|
| EP | 3083205 B1 | 2/2021 |
| WO | 2020046212 A1 | 3/2020 |
| WO | 2021003444 A2 | 1/2021 |
| WO | 2021070174 A1 | 4/2021 |
| WO | 2021097134 A1 | 5/2021 |

OTHER PUBLICATIONS

O'Dowd, N.M. et al., "Effects of digital fringe projection operational parameters on detecting powder bed defects in additive manufacturing", Additive Manufacturing, vol. 48, Part B, Dec. 2021, 25 pages.

* cited by examiner

STRUCTURED LIGHT PART QUALITY MONITORING FOR ADDITIVE MANUFACTURING AND METHODS OF USE

CROSS-REFERENCE TO RELATED APPLICATIONS

The present application claims priority from PCT application Ser. No. PCT/US2022/045648, filed on Oct. 4, 2022, which claims priority from U.S. provisional application Ser. No. 63/253,271, filed Oct. 7, 2021 and U.S. provisional application Ser. No. 63/374,452, filed Sep. 2, 2022, all herein incorporated by reference in their entireties.

BACKGROUND

The invention generally relates to using a structured light monitoring system to detect defects in the additive manufacturing process.

The current status quo of monitoring additive manufacturing is visual inspection, which includes technicians walk around the shop floor and peer into the viewing windows of 3D printers to look for visual indications of defects occurring in the powder bed chamber of the printers.

There are a few commercially available in-situ monitoring systems. The most known in industry is the melt pool monitoring system produced by EOS which uses photodiodes in the optical path to measure "temperature" of the melt pool. User experience indicates that it is difficult for this system to extract useful information, as it produces large data sets in the TB range, and it is unclear how to reduce the data to "go/no-go" decisions through automated means. This system is built into the EOS 3D printer system, and does not work across different makes and models of printer.

Another in-process monitoring system which can be installed on many different 3D printer brands is the melt pool monitoring system from SigmaLabs. This system monitors the melt pool of the 3D printing process, but requires the addition of a warranty-voiding integration of the sensor into the beamline of the printer. This sort of retrofit is a hindrance for widespread use of this type of sensor, and the decision-making go-no-go analysis may be buried in immense amounts of data, too large to process in real-time.

The disadvantages of using visual inspection to evaluate the health (or detect defects) are: 1) relies on subjective human opinions; 2) only can be applied to current layer; 3) requires costly labor to observe the build; 4) and defects may be missed when technician not observing the process The disadvantages of using current in-process monitoring melt pool analysis techniques are that they are (1) cost-prohibitive, (2) don't provide actionable "go/no-go" information in real time, (3) require expert knowledge (4) require the analysis of large sets of data; (5) are not real-time; (6) may void the warranty of the printer if it is a retrofit.

The present invention attempts to solve these problems as well as others.

SUMMARY OF THE INVENTION

Provided herein are systems, methods, and apparatuses for Structured Light Part Quality Monitoring for Additive Manufacturing.

The methods, systems, and apparatuses are set forth in part in the description which follows, and in part will be obvious from the description, or can be learned by practice of the methods, apparatuses, and systems. The advantages of the methods, apparatuses, and systems will be realized and attained by means of the elements and combinations particularly pointed out in the appended claims. It is to be understood that both the foregoing general description and the following detailed description are exemplary and explanatory only and are not restrictive of the methods, apparatuses, and systems, as claimed.

Accordingly, it is an object of the invention not to encompass within the invention any previously known product, process of making the product, or method of using the product such that Applicants reserve the right and hereby disclose a disclaimer of any previously known product, process, or method. It is further noted that the invention does not intend to encompass within the scope of the invention any product, process, or making of the product or method of using the product, which does not meet the written description and enablement requirements of the USPTO (35 U.S.C. § 112, first paragraph), such that Applicants reserve the right and hereby disclose a disclaimer of any previously described product, process of making the product, or method of using the product. All rights to explicitly disclaim any embodiments that are the subject of any granted patent(s) of applicant in the lineage of this application or in any other lineage or in any prior filed application of any third party is explicitly reserved. Nothing herein is to be construed as a promise.

BRIEF DESCRIPTION OF THE DRAWINGS

In the accompanying figures, like elements are identified by like reference numerals among the several preferred embodiments of the present invention.

Heightmap from Fringe Projection Taken after powder spreading, before melting; the general features observed include: Powder streaking, powder skew, non-even powder distribution.

Figure 13:
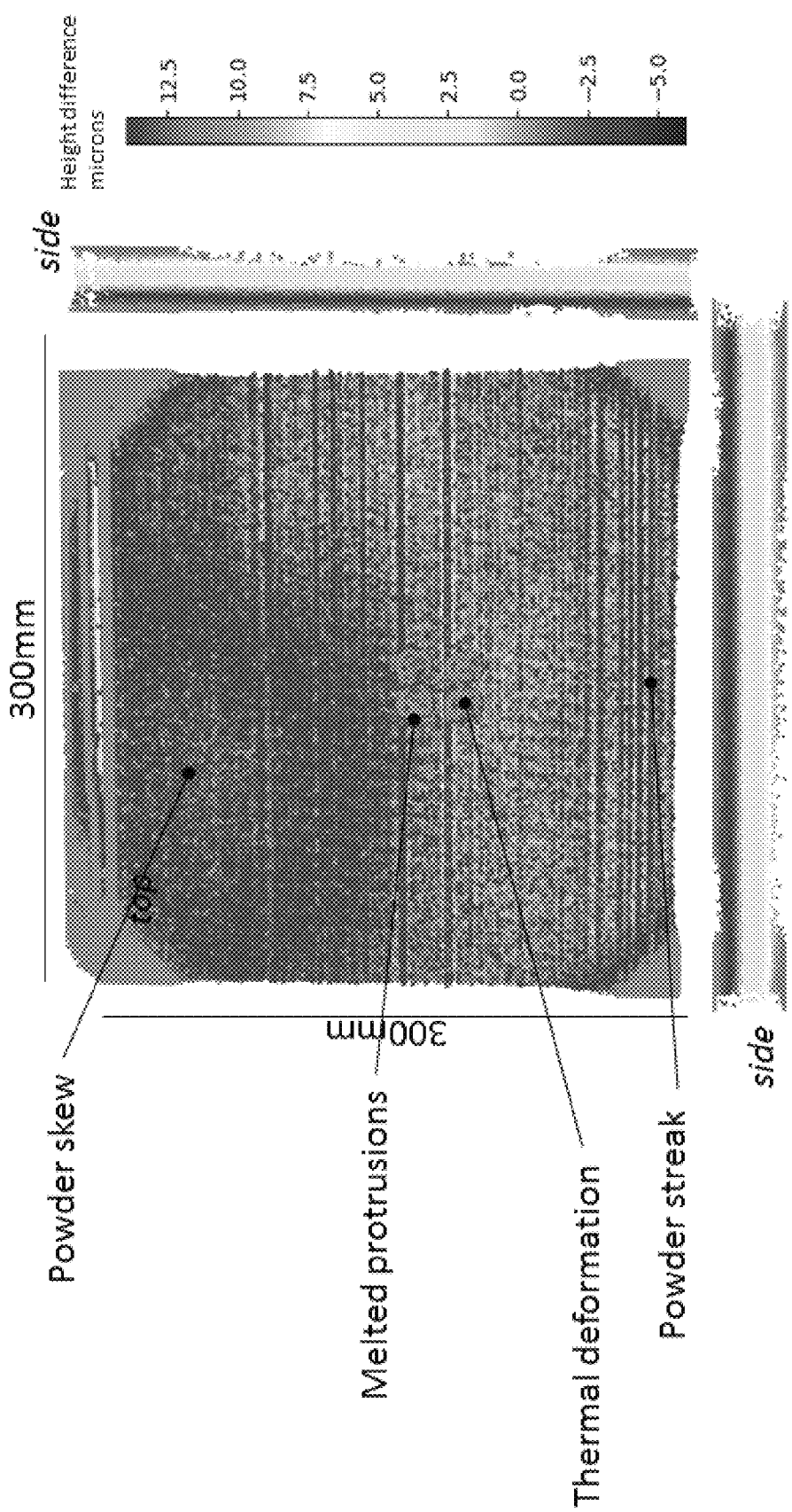

FIG. 13 is a Coloured 3D Point Cloud (Process L-PBF) graph showing the Typical Heightmap from Fringe Projection Taken after melting; the general features include: Powder streaking, powder skew, non-even powder distribution, thermal deformation, melted area, protrusions.

Figure 14A:
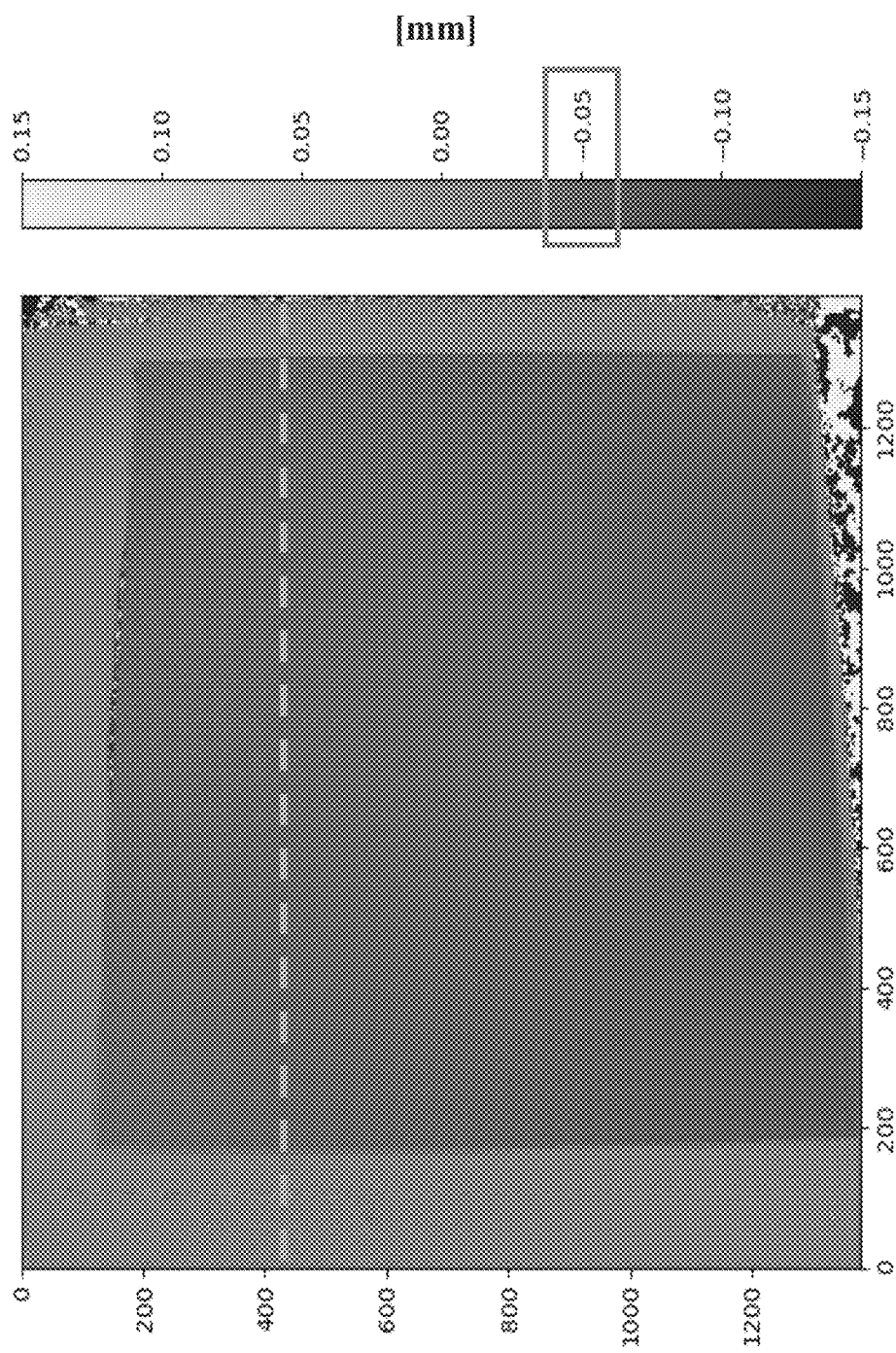
Figure 14B:
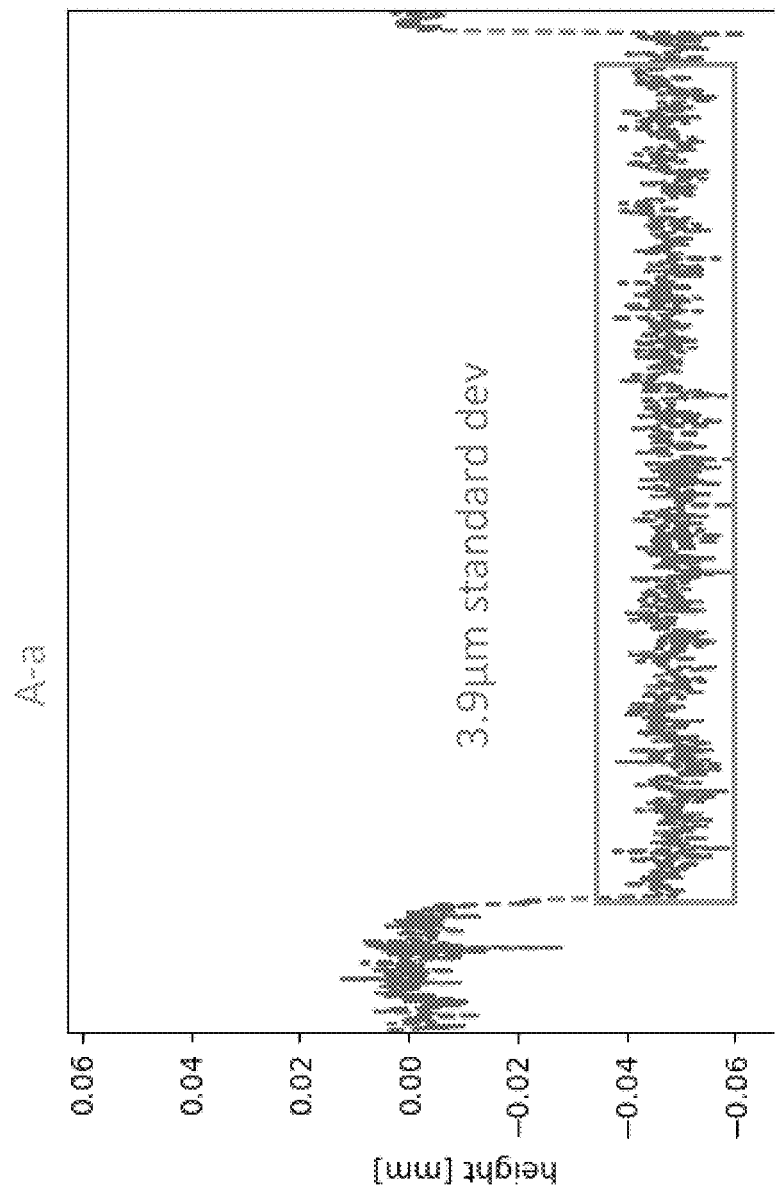

FIGS. 14A-14B are graphs showing the Typical Heightmap from Fringe Projection of powder bed lowered to −50 microns; and the general features include: 3D measurement of powder layer at bed level −50 microns; FIG. 14A shows the heightmap of the powder bed. FIG. 14B shows the cross section of the heightmap. (Process L-PBF)

Figure 15A:
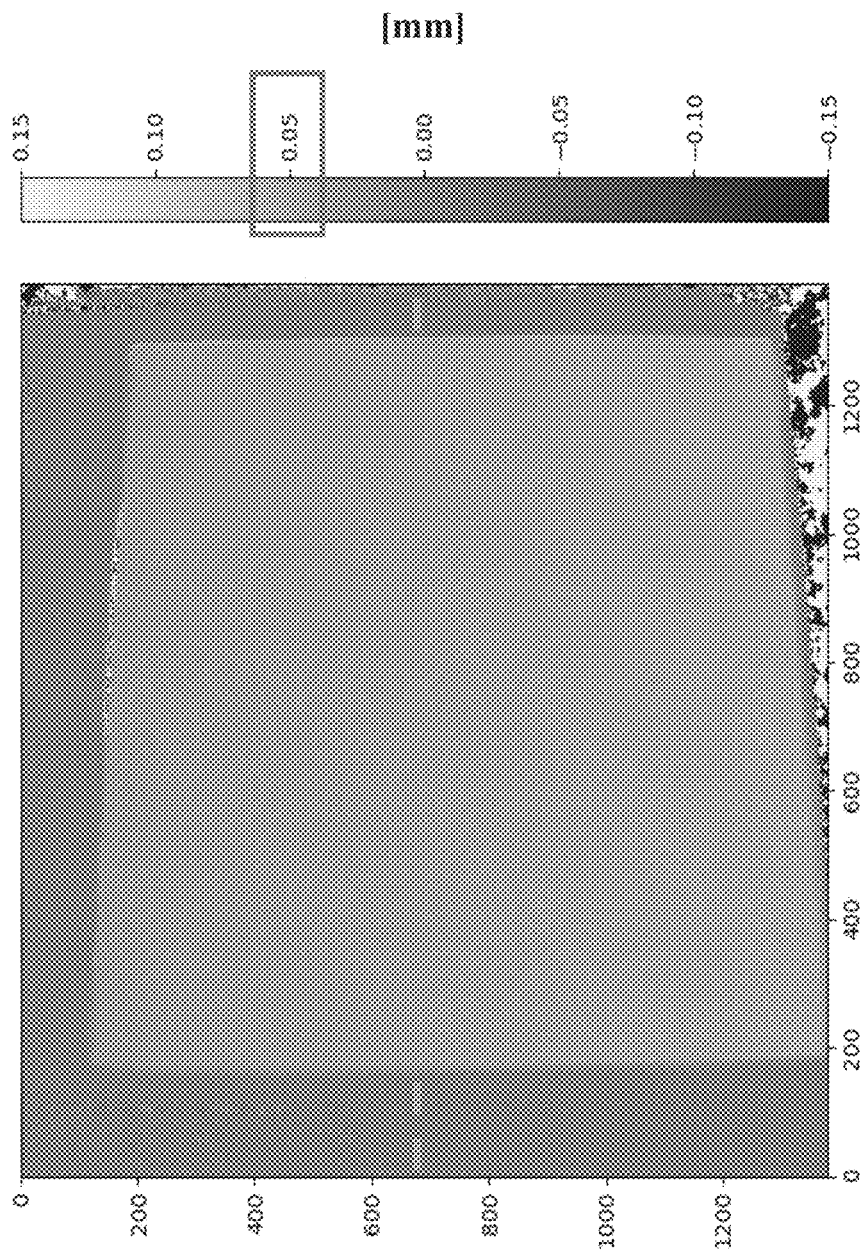
Figure 15B:
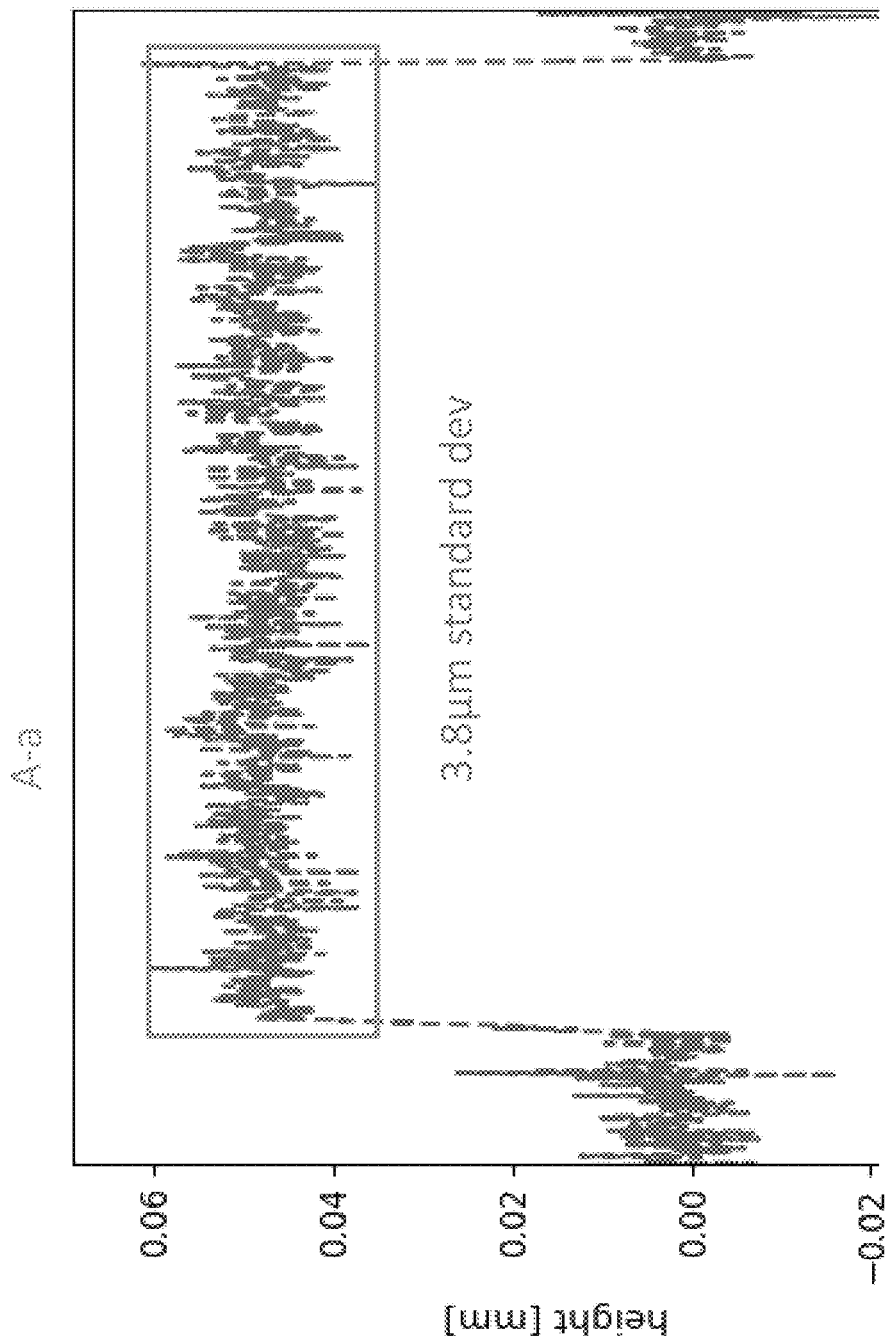

FIGS. 15A-15B are graphs showing the Typical Heightmap from Fringe Projection of powder bed raised to +50 microns; FIG. 15A shows the heightmap of the powder bed; FIG. 15B shows the cross section of the heightmap. (Process L-PBF); and the features observed include: 3D measurement of powder layer at bed level +50 microns.

Figure 16A:
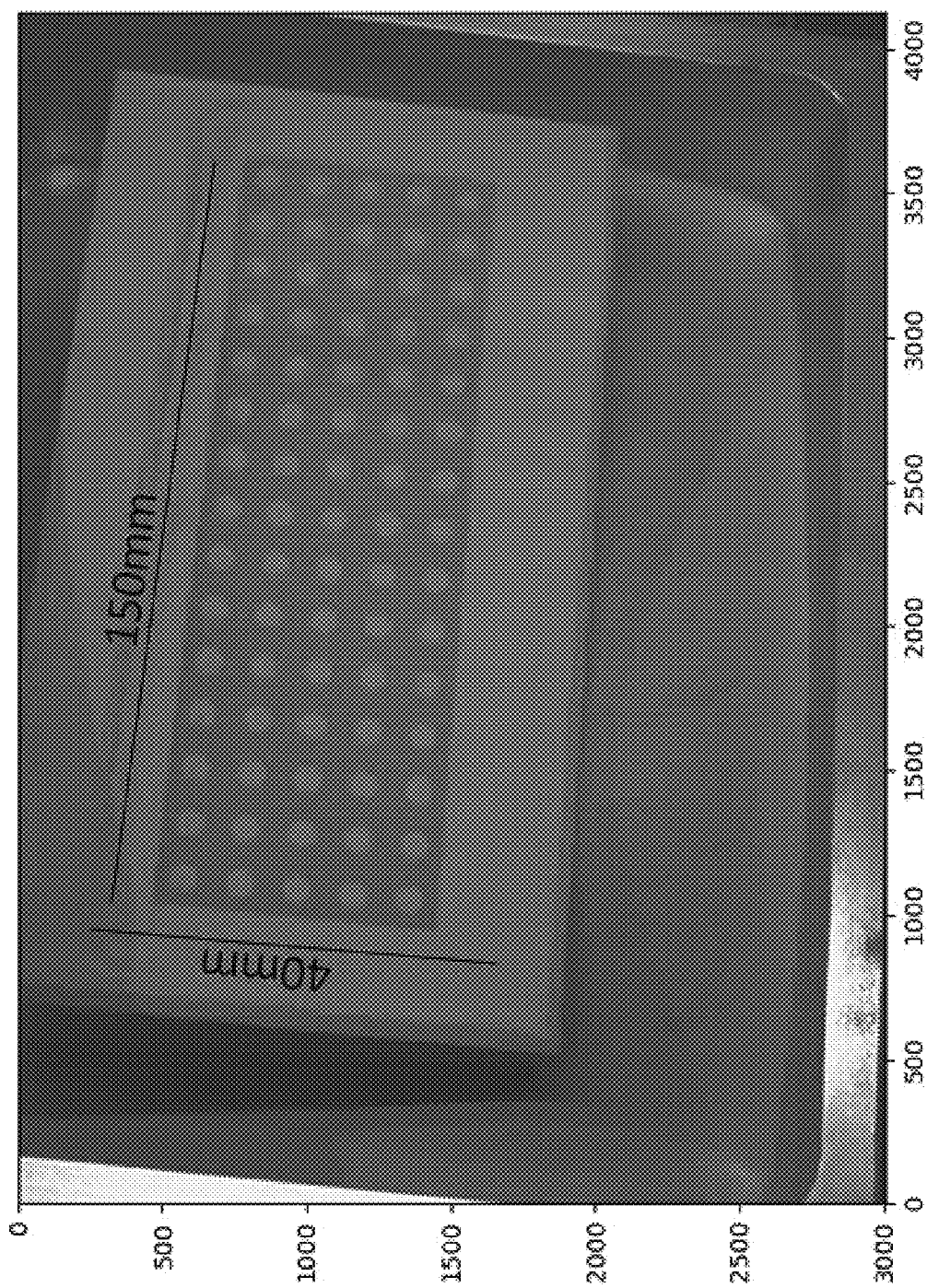
Figure 16B:
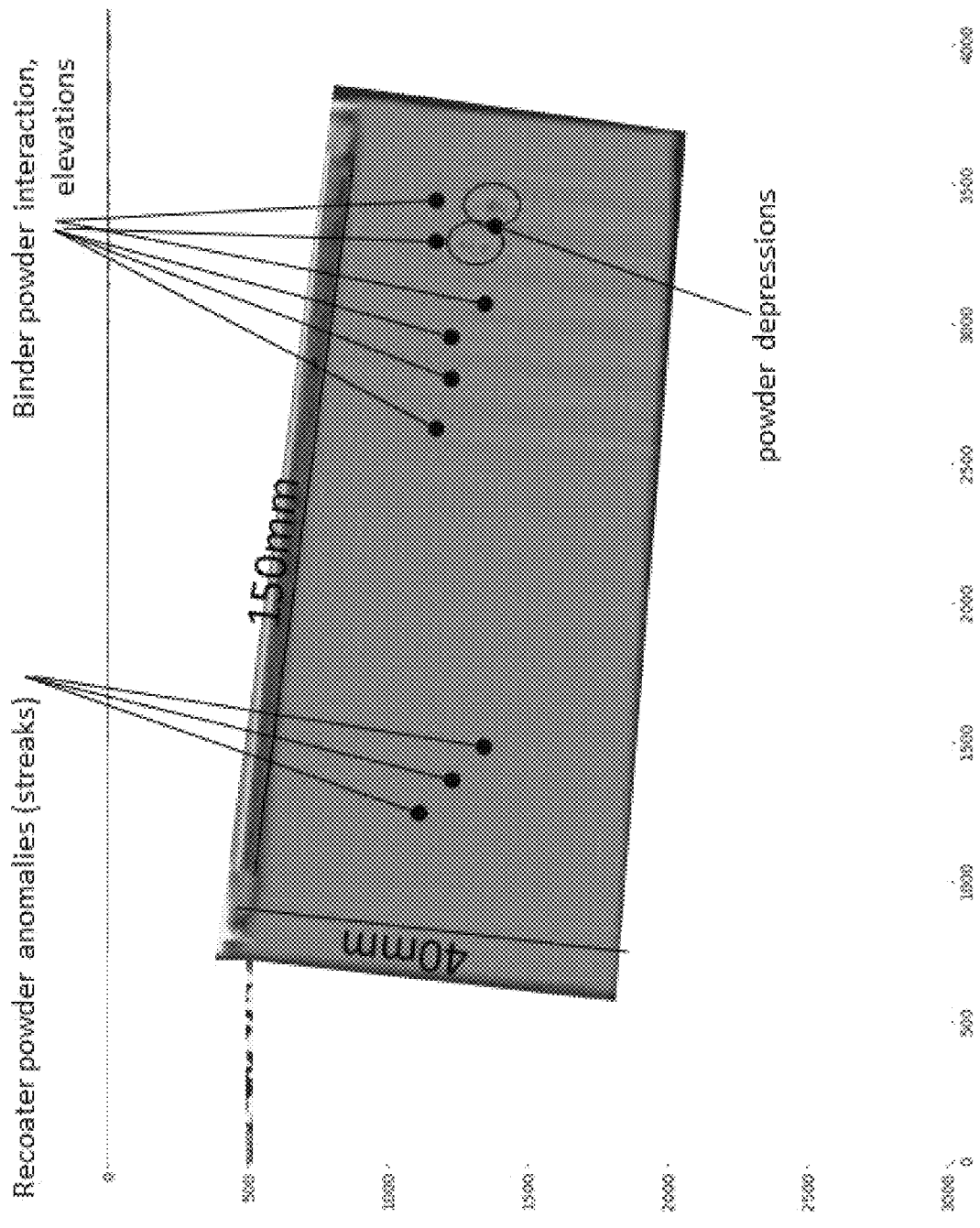

FIG. 16A is a graph showing the heightmap of the powder bed of the Visual image of binder jetting process after binder deposition; FIG. 16B is a graph showing the cross section of the heightmap. (Process Binder Jetting) for a Typical phasemap from Fringe Projection after binder deposition; the features observed include: Recoater roller powder anomalies, binder powder interaction, binder streaking, elevations, surface depressions.

Figure 17:
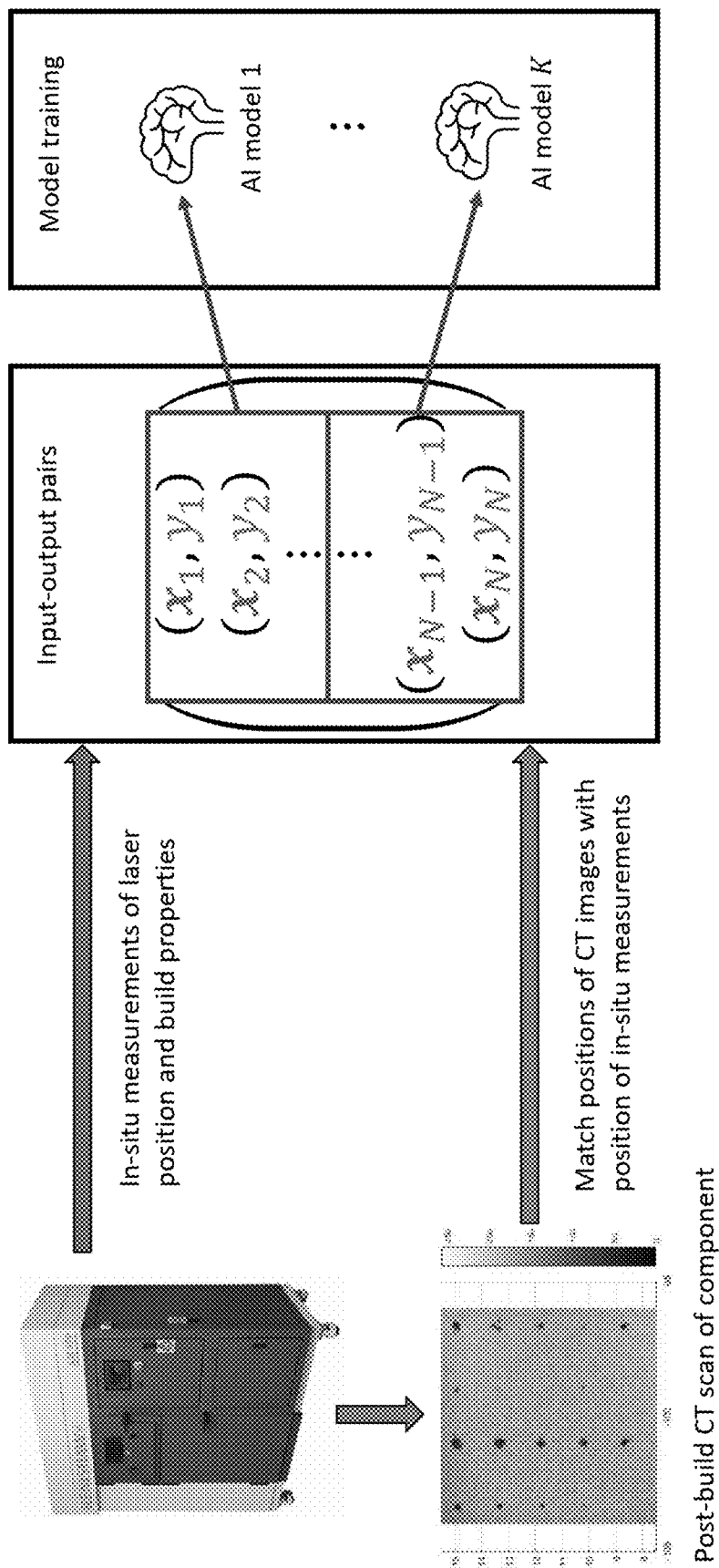

FIG. 17 is a schematic flow chart showing the Training of neural network and gaussian process regression on heightmap. Training of the GPR model. To construct training data, in-situ data is position-matched with the greyscale of the CT image, creating "input-output pairs". To avoid significant computational overheads, this training data is then split between an ensemble of K GPR models.

Figure 18:
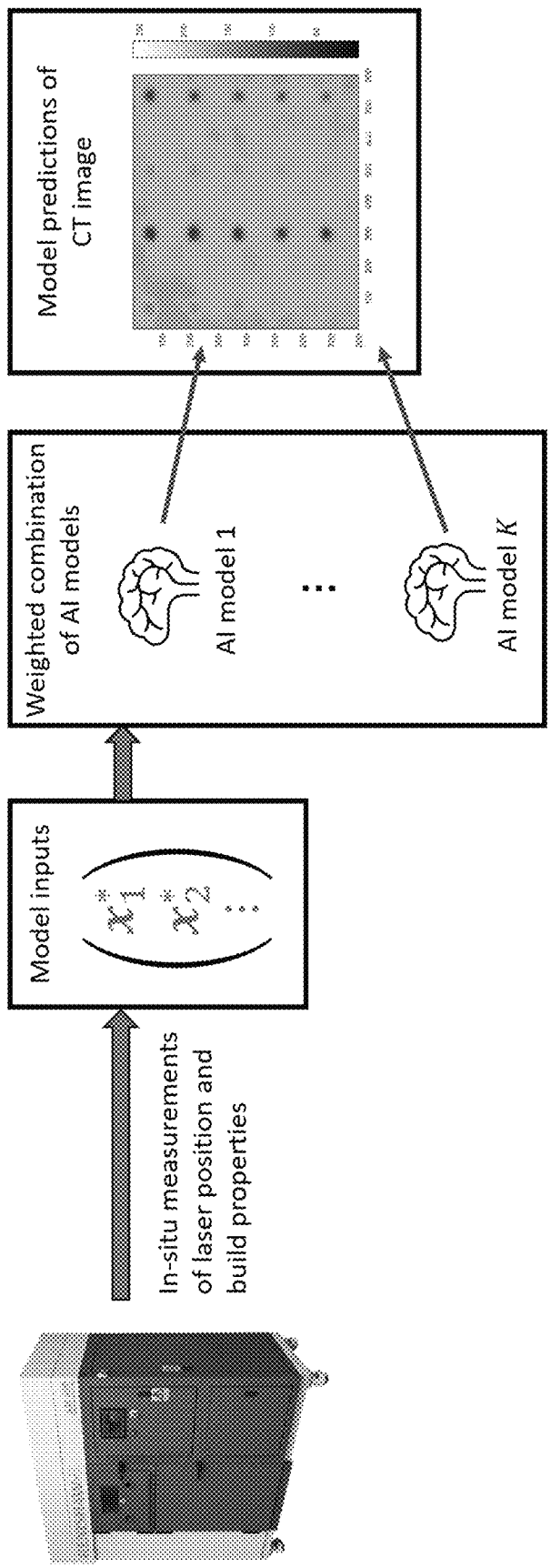

FIG. 18 is a schematic flow chart showing the Operation of neural network and gaussian process regression on heightmap; the features include: Predictions using the GPR model. In-situ measurements are taken during a build and fed into the ensemble of GPR models. The predictions made by each GPR model are then combined to realize grey-scale values, forming an AI-generated predictor of porosity.

Figure 19:
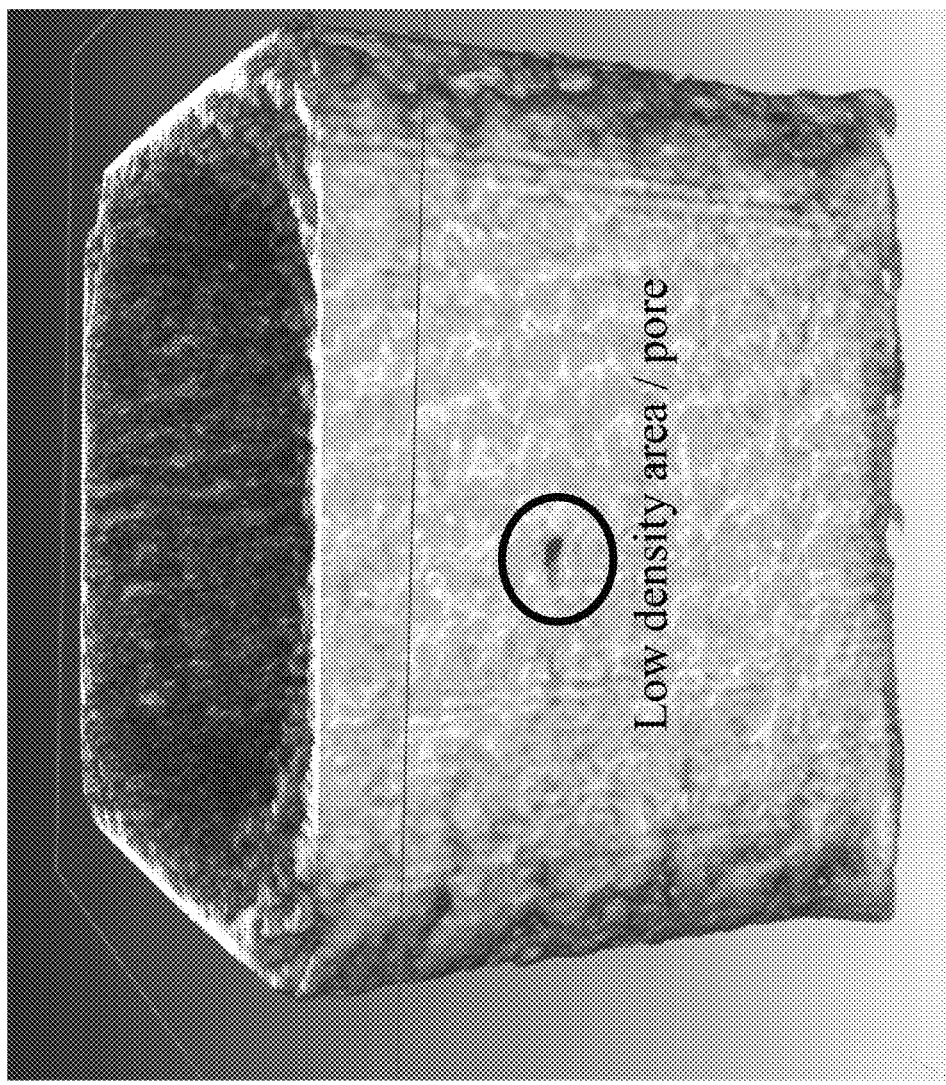

FIG. 19 is a CT scan for the Ground truth verification of printed specimen including the Training data collection example for gaussian process regression and neural network training; and the features include Low density area, potential pore location.

Figure 20:
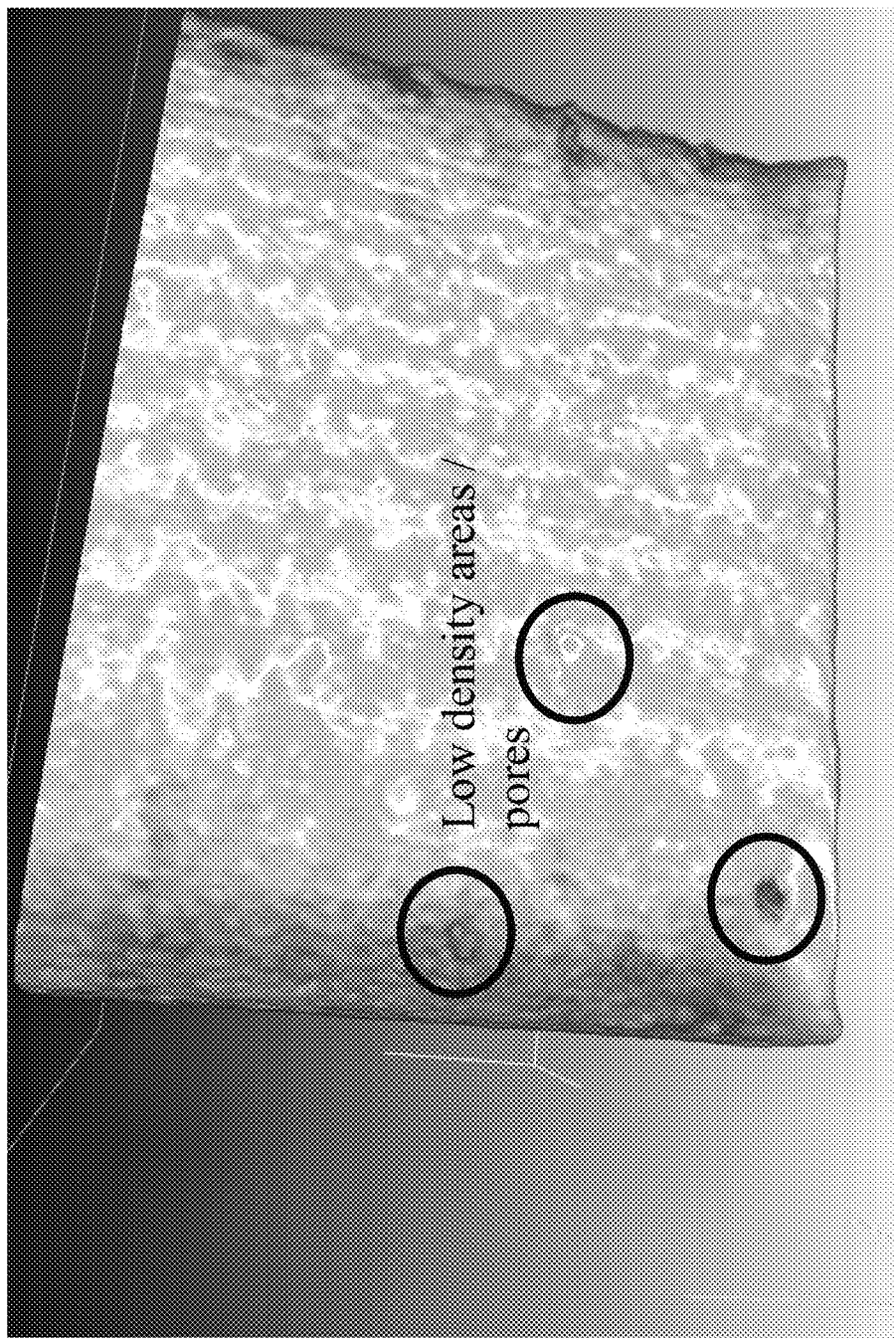

FIG. 20 is a CT scan for the Ground truth verification of printed specimen including Training data collection example for gaussian process regression and neural network training; and the features include: Low density area, potential pore location.

Figure 21:
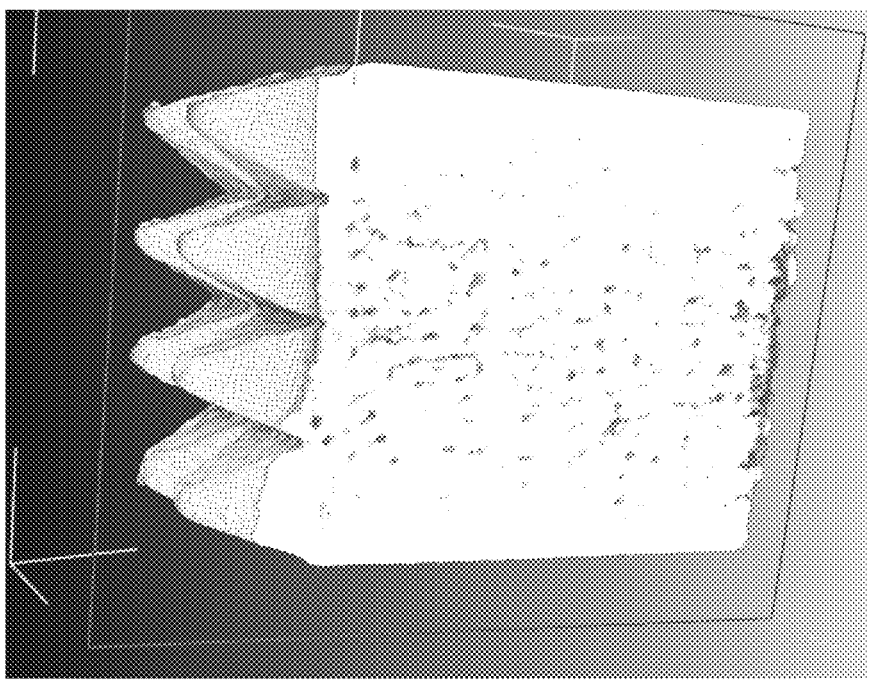

FIG. 21 is a CT scan for the Ground truth verification of printed specimen including Training data collection example for gaussian process regression and neural network training; features include: Low density area, potential pore location, Low density areas identified with AI/ML.

Figure 22:
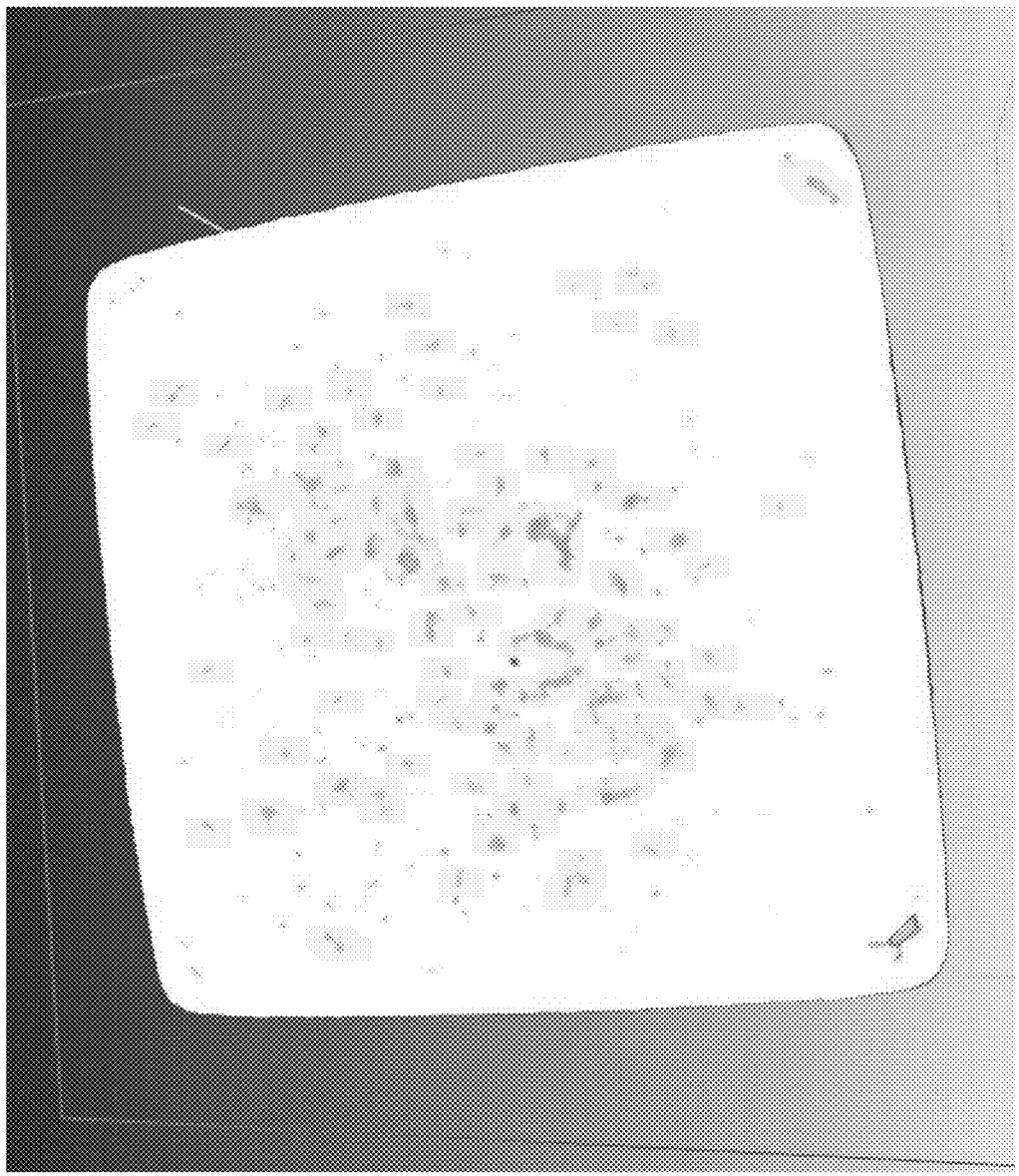

FIG. 22 is a CT scan Ground truth verification of printed specimen including Training data collection example for gaussian process regression and neural network training; features include: Low density area, potential pore location, Low density areas identified with AI/ML.

Figure 23A:
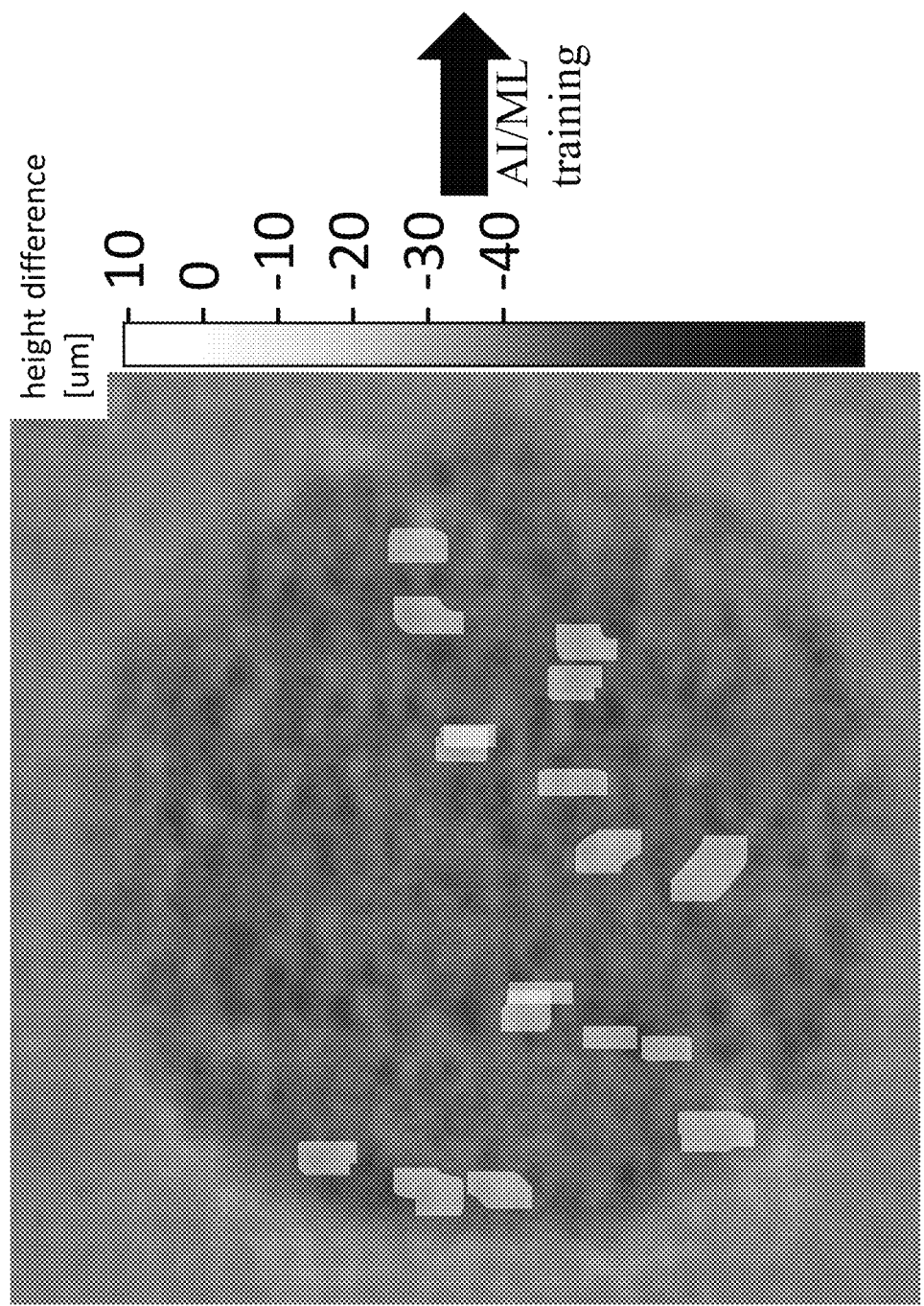
Figure 23B:
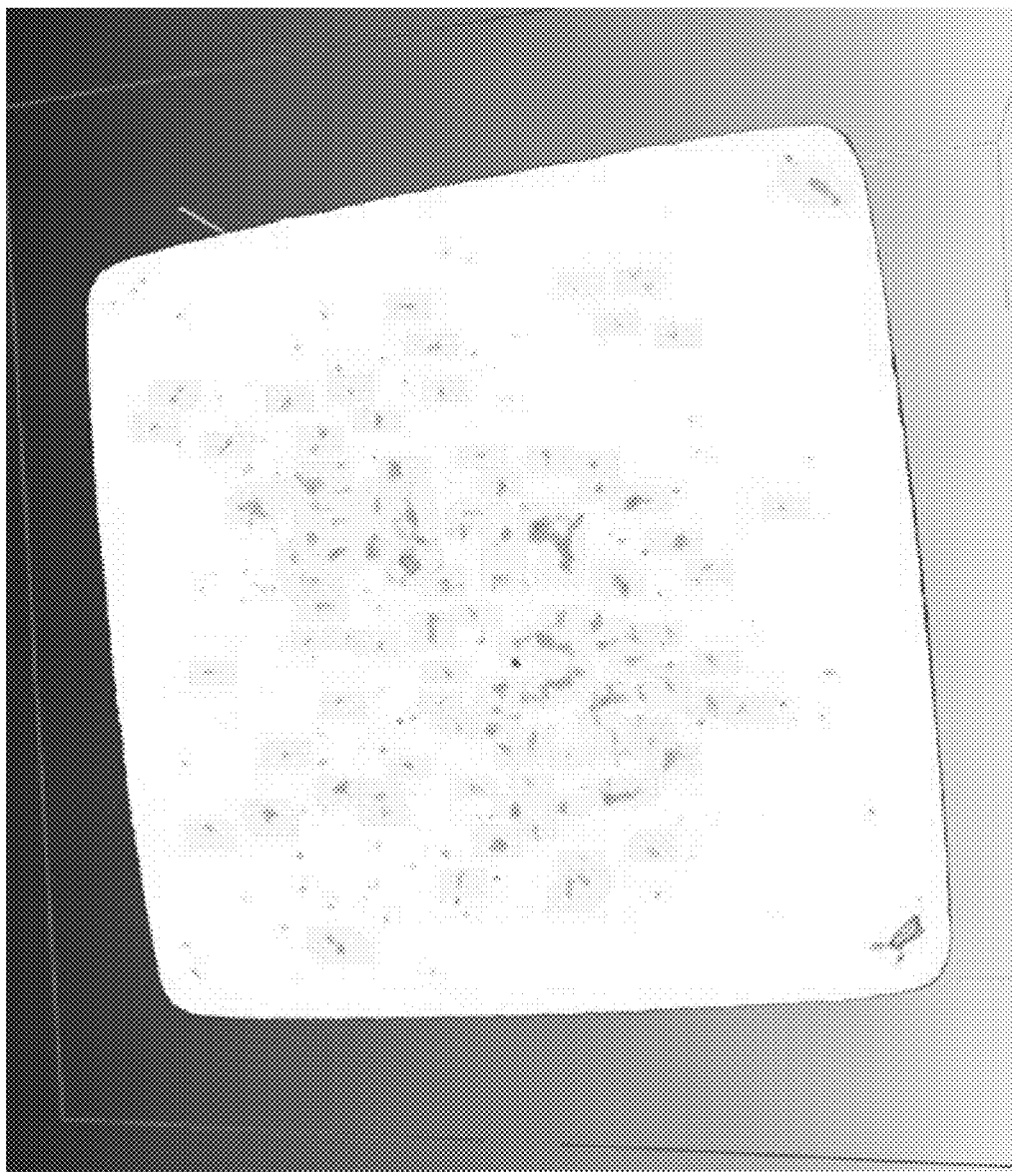

FIG. 23A is a graph showing the Print anomalies observed using heightmapping (difference between powder and melted) layer 567; FIG. 23B is a graph showing the Low density areas identified with AI/ML, Slice 567; In situ data and AI/ML and gaussian process regression prediction testing of low density and/or porosity locations; and features include: Low density area, potential pore location, Low density areas identified with AI/ML.

Figure 24A:
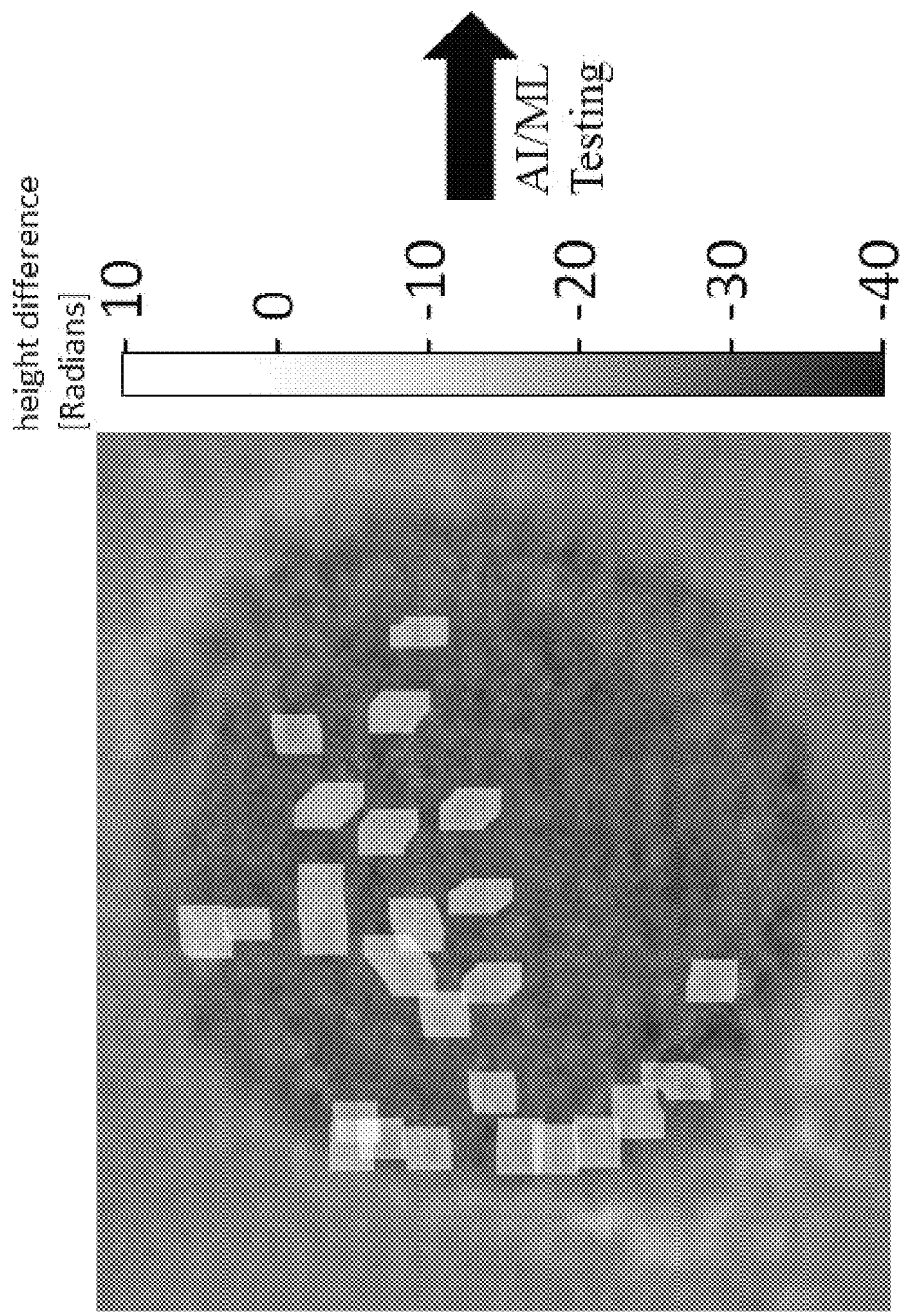
Figure 24B:
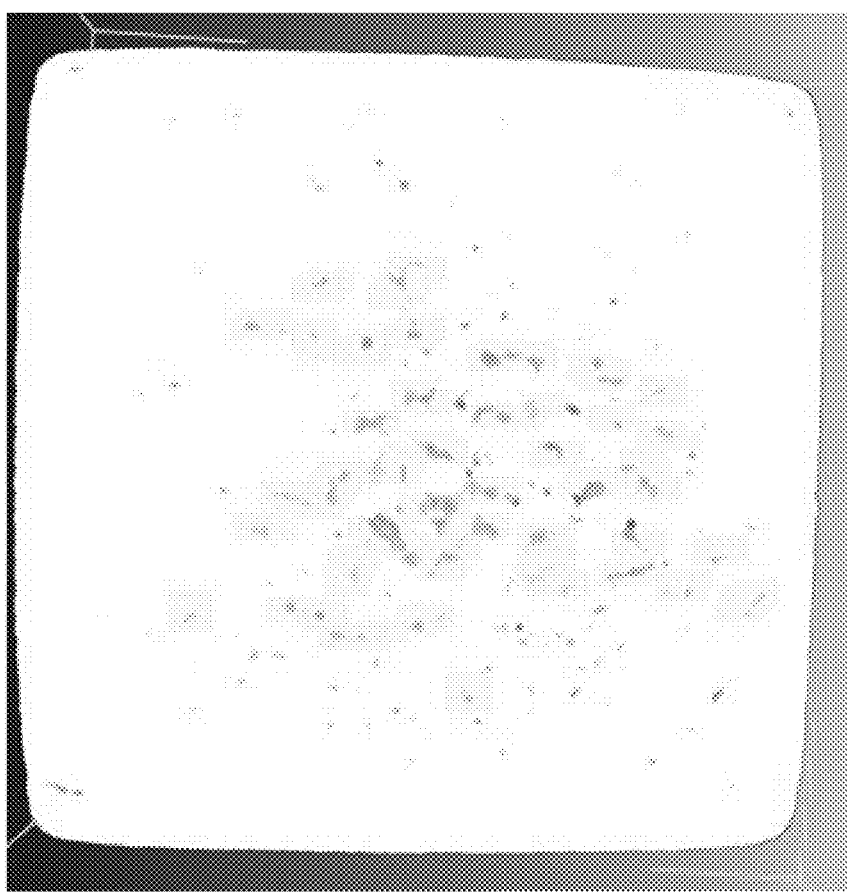

FIG. 24A is a In situ data of low density and/or porosity locations graph showing the Print anomalies observed using height mapping (difference between powder and melted) layer 567; FIG. 24B is an AI/ML and gaussian process regression prediction testing of low density and/or porosity locations graph showing the Low density areas identified with AI/ML, Slice 567; features include: low density area, potential pore location, Low density areas identified with AI/ML.

Figure 25:
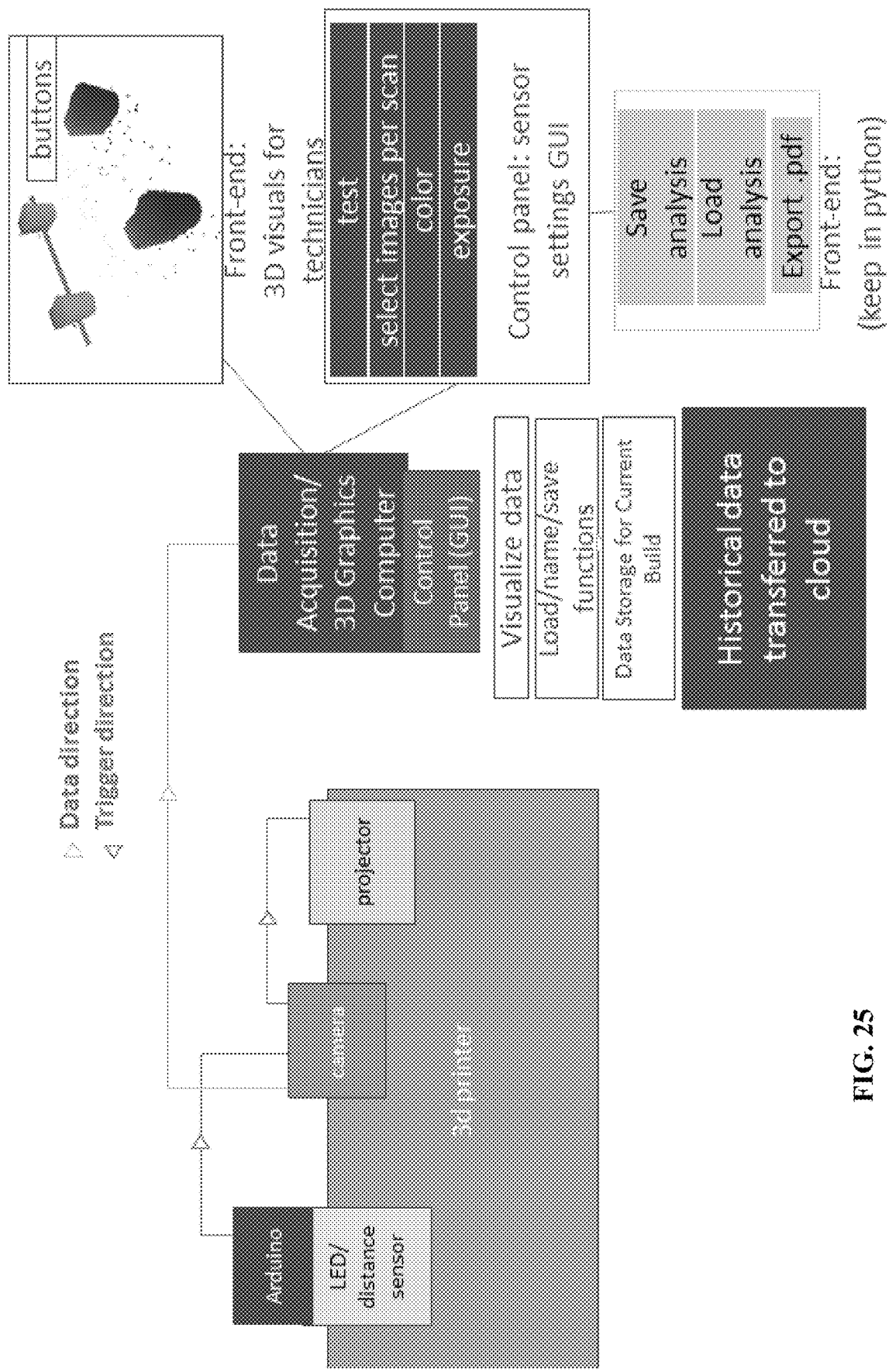
Figure 26:
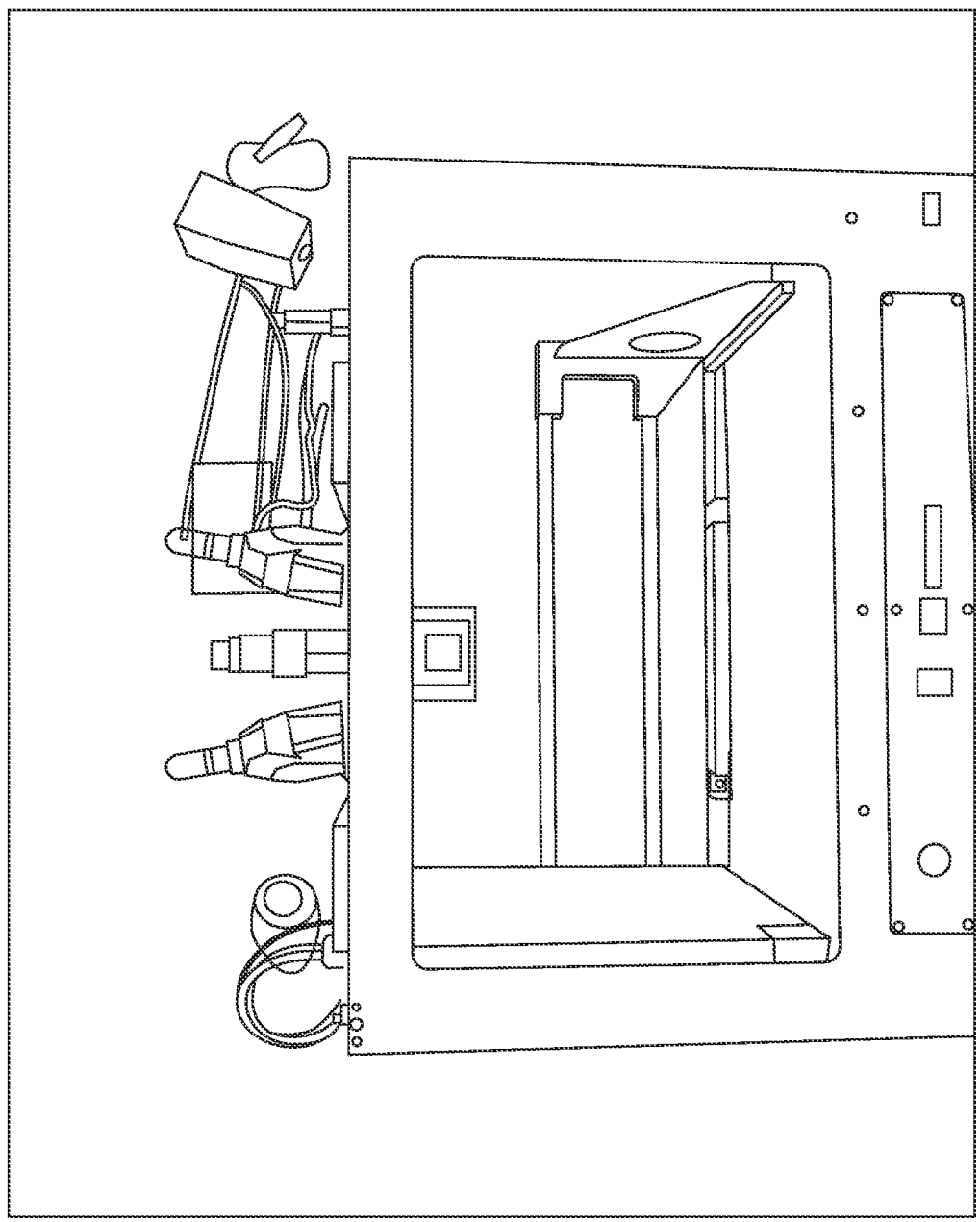

FIG. 25 is a system diagram of the monitoring system including the Hardware/software elements FIG. 26 is a photo of a monitoring system attached to printer (laser powder bed fusion) showing the System setup.

Figure 27:
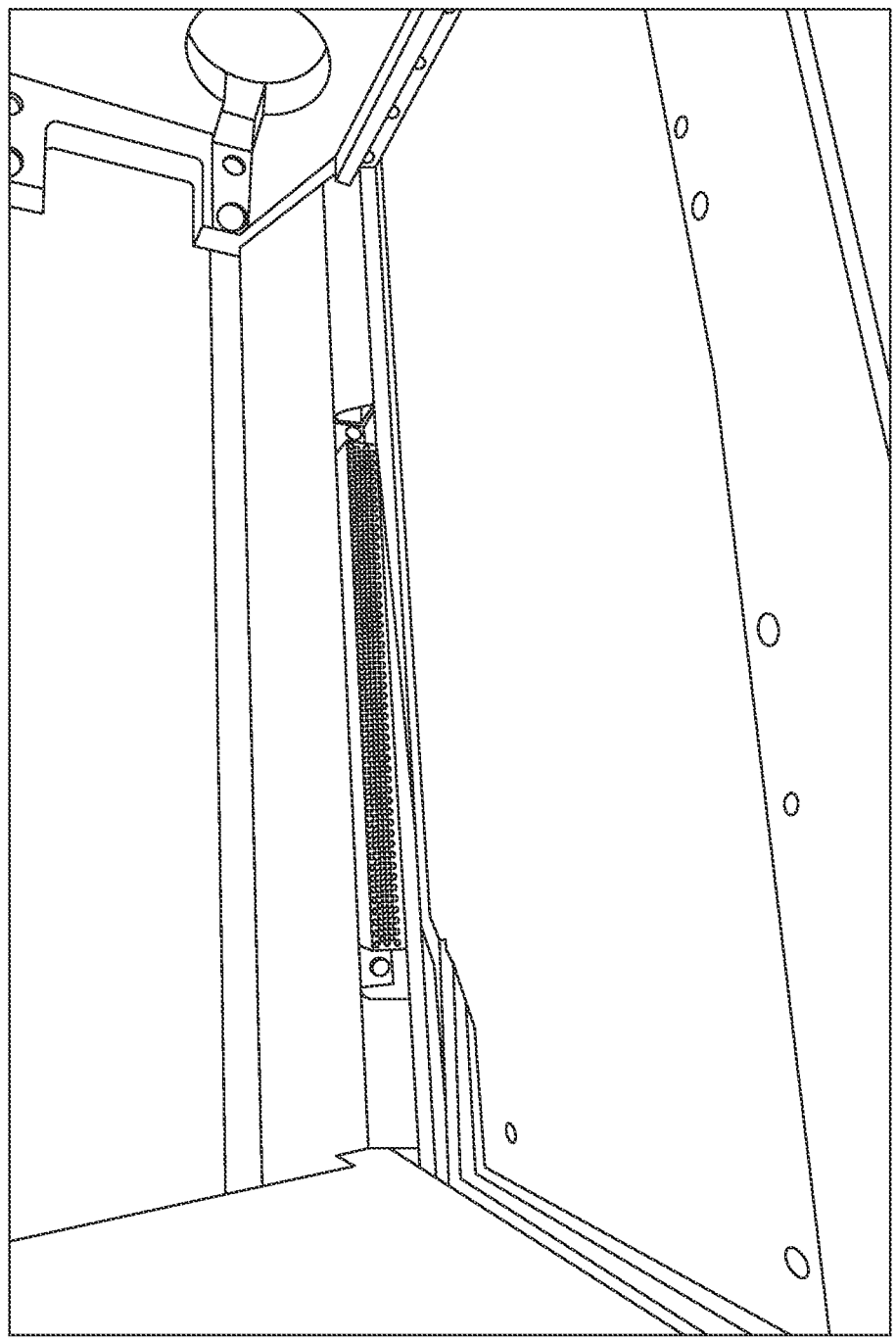

FIG. 27 is a photo showing the fringe pattern on powderbed; and the features include: powder area, fringe pattern.

Figure 28:
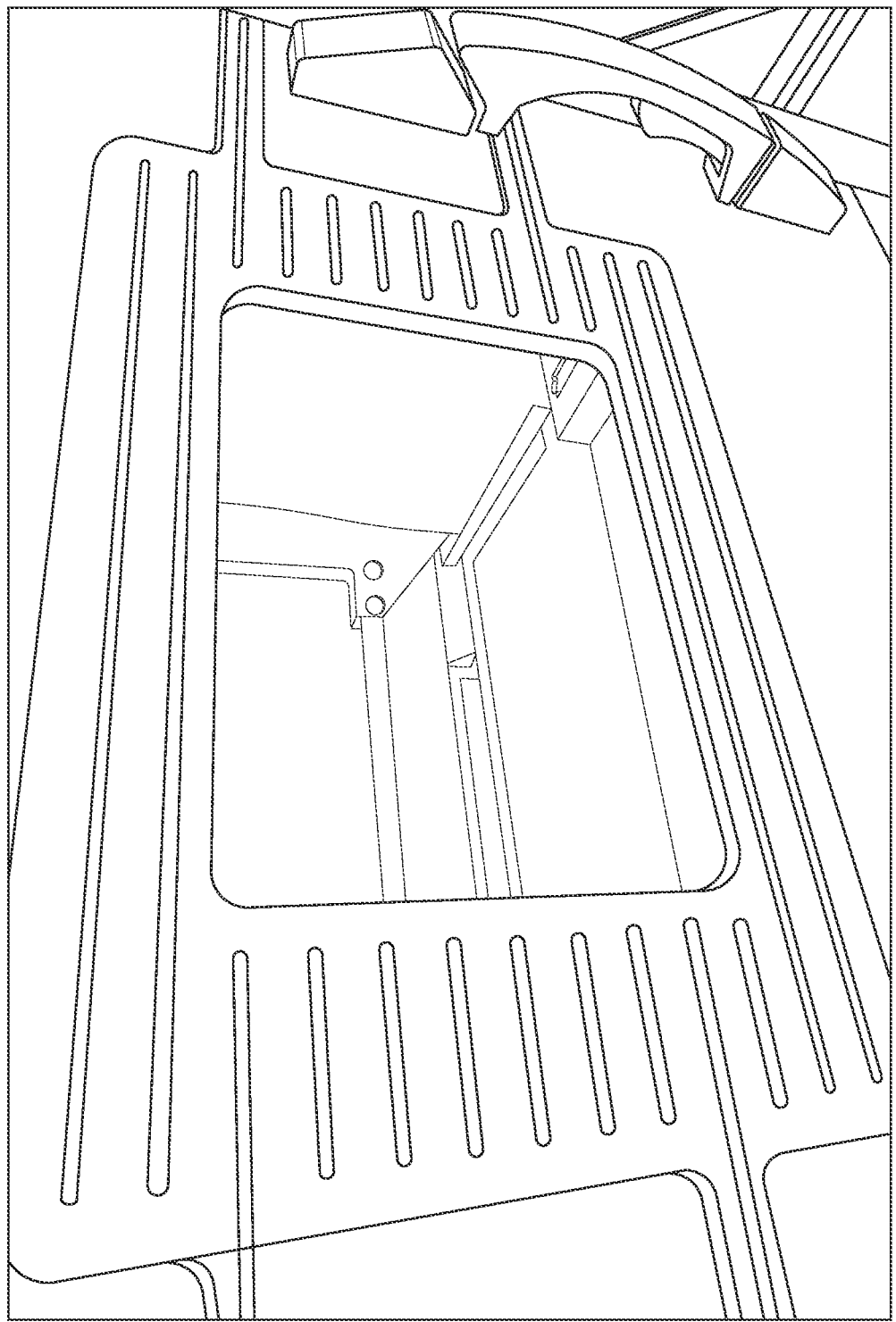

FIG. 28 is a photo showing the fringe pattern on powderbed (2); and the features include: Melted area, powder area, fringe pattern.

Figure 29B:
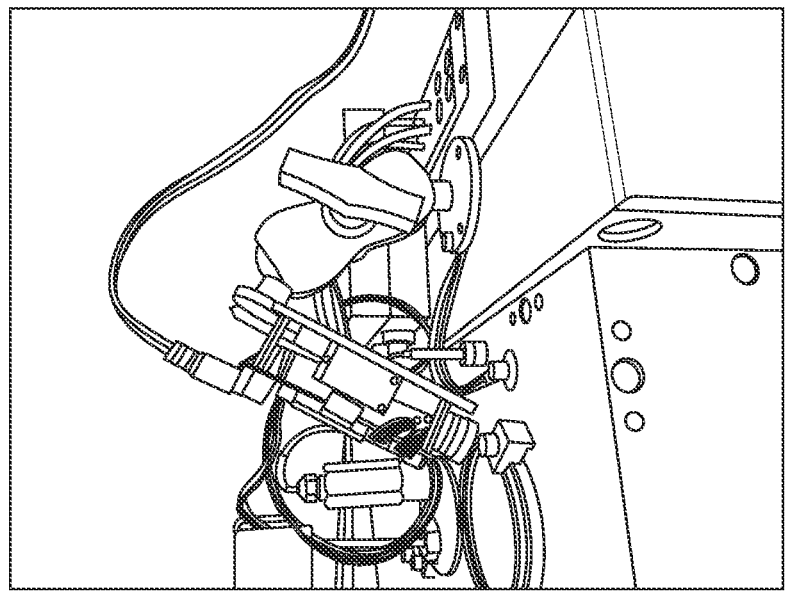
Figure 29A:
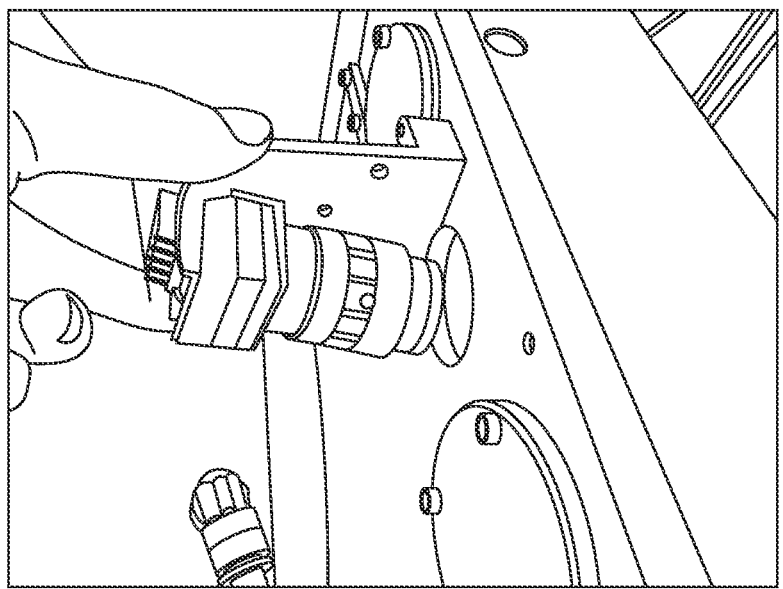

FIG. 29A is photograph showing the camera system. Camera mounted on EOS M 290 Powder Bed Fusion 3D printer; FIG. 29B is a photograph showing the projector system. Projector mounted on EOS M 290 Powder Bed Fusion 3D printer.

Figure 30:
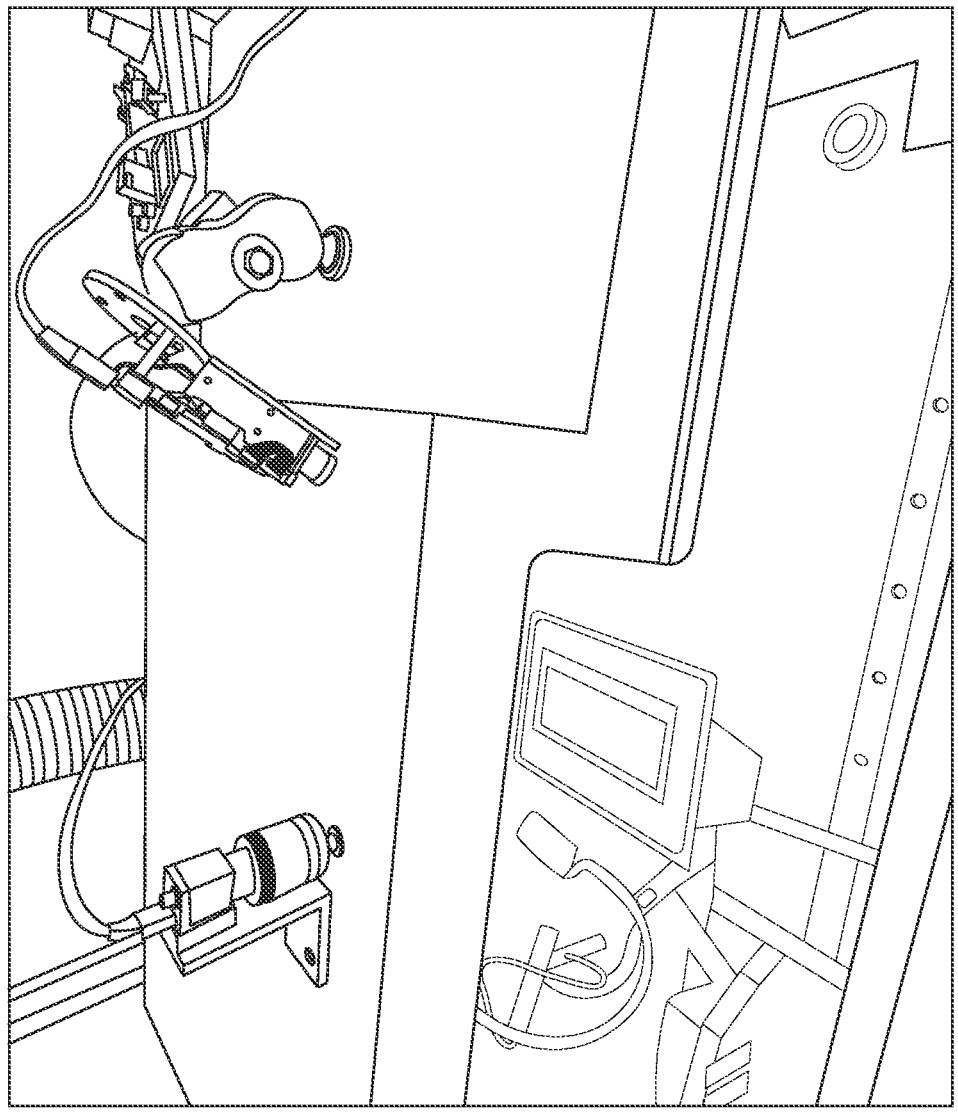

FIG. 30 is a photograph showing the camera system. Camera mounted on exone innovent binder jetting 3d printer and the projector system. Projector mounted on exone innovent binder jetting 3d printer.

DETAILED DESCRIPTION OF THE INVENTION

The foregoing and other features and advantages of the invention are apparent from the following detailed description of exemplary embodiments, read in conjunction with the accompanying drawings. The detailed description and drawings are merely illustrative of the invention rather than limiting, the scope of the invention being defined by the appended claims and equivalents thereof.

Embodiments of the invention will now be described with reference to the Figures, wherein like numerals reflect like elements throughout. The terminology used in the description presented herein is not intended to be interpreted in any limited or restrictive way, simply because it is being utilized in conjunction with detailed description of certain specific embodiments of the invention. Furthermore, embodiments of the invention may include several novel features, no single one of which is solely responsible for its desirable attributes or which is essential to practicing the invention described herein.

The words proximal and distal are applied herein to denote specific ends of components of the instrument described herein. A proximal end refers to the end of an instrument nearer to an operator of the instrument when the instrument is being used. A distal end refers to the end of a component further from the operator and extending towards the area.

The use of the terms "solidification process" or "solidified layer" refers to the process or result in which a transformation of the metal or polymer powder is fused to either a portion of the 3D printing machine, or the part which is being printed. This may occur through a thermal process, such as melting, or sintering, or through a chemical binding process.

The use of the terms "a" and "an" and "the" and similar referents in the context of describing the invention are to be construed to cover both the singular and the plural, unless otherwise indicated herein or clearly contradicted by context. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Recitation of ranges of values herein are merely intended to serve as a shorthand method of referring individually to each separate value falling within the range, unless otherwise indicated herein, and each separate value is incorporated into the specification as if it were individually recited herein. The word "about," when accompanying a numerical value, is to be construed as indicating a deviation of up to and inclusive of 10% from the stated numerical value. The use of any and all examples, or exemplary language ("e.g." or "such as") provided herein, is intended merely to better illuminate the invention and does not pose a limitation on the scope of the invention unless otherwise claimed. No language in the specification should be construed as indicating any nonclaimed element as essential to the practice of the invention.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Description

Generally speaking, the Structured Light Part Quality Monitoring for Additive Manufacturing comprises a structured light monitoring system to detect defects in the additive manufacturing process. This Project Fringe using structured light monitoring measurements and material information to estimate the statistical likelihood of a defect occurring. Additive Manufacturing (AM) systems commonly referred to as 3D printers, add layers of build material which is subsequently solidified. This layer add process can lead to defects in the final part.

Project Fringe spatially encodes a unique phase value for a unidirectional datum for each surface of measurement. This is accomplished by projecting pre-defined patterns onto the measurement surface, which can either be a build plate, powder layer, melted layer, binded layer, or sintered layer. With the phase values encoded onto the surface of measurement, process anomalies during the printing process can be detected. These anomalies during the printing process can include but are not limited to: recoater cross sectional information, build surface skew, plate skew, build plate flatness, build plate vibration, build plate vertical accuracy, powder coating thickness, powder coating roughness, powder coating streaking, powder coating hopping, powder coating short feeds, powder coating clumps, powder coating agglomerations, changes in powder coating after melting or solidification or binding, non-uniform powder particles, thermal deformation, over melting, under melting, component protrusions, absolute layer height from a reference, material disintegration, support structure strain, overall strain, surface strain, particle spitting, particle aggregation, particle agglomeration, uneven melting, uneven sintering, laser spacing effects, laser spot size, laser power, binder ballistic effect, binder powder interaction, binder deposition height solidification, or any other physical phenomena which shift the encoded spatial phase from a reference plane either measured or mathematical.

The features above may be apparent in the spatially encoded phase data, or extracted using a match filter. These features may be extracted using kernel convolutional techniques, absolute phase difference measurement, Separable Convolution, Dilated convolution, Atrous Convolution, Deformable convolution, demodulation, Fourier transformations, Hilbert transformations, Gaussian filtering, flat box filtering, Sobel filters, Sobel operators, Sobel-Fieldman operators, Prewitt operators, Laplacian operators.

In addition to generating the spatial phase encoded surface maps, Project Fringe can also generate height maps. Project Fringe generates a height map of the powder bed chamber, which records the height of each deposited powder layer and/or solidified layer, classifies these height maps as "in-spec" or "out-of-spec", and alerts the Operator/Technician/Engineer of these height anomalies.

The Project Fringe comprises a modular hardware and a software system that operably couples to many types of 3D printer (additive manufacturing printers) to provide measurements of the exposed surface of parts and the feedstock material in real-time. Using these height measurements, separate from the phase measurements, process anomalies during the printing process can be detected. These anomalies during the printing process can included but not limited to: recoater cross sectional information, build surface skew, plate skew, build plate flatness, build plate vibration, build plate vertical accuracy, powder coating thickness, powder coating roughness, powder coating streaking, powder coating hopping, powder coating short feeds, powder coating clumps, powder coating agglomerations, changes in powder coating after melting or solidification or binding, non-uniform powder particles, thermal deformation, over melting, under melting, component protrusions, absolute layer height from a reference, material disintegration, support structure strain, overall strain, surface strain, particle spitting, particle aggregation, particle agglomeration, uneven melting, uneven sintering, laser spacing effects, laser spot size, laser power, binder ballistic effect, binder powder interaction, binder deposition height solidification, or any other physical phenomena which shift the encoded spatial phase from a reference plan either measured or mathematical.

The features above may be apparent in the height data, or extracted using a match filter. These features may be extracted using kernel convolutional techniques, absolute height difference measurement, Separable Convolution, Dilated convolution, Atrous Convolution, Deformable convolution, demodulation, Fourier transformations, Hilbert transformations, Gaussian filtering, flat box filtering, Sobel filters, Sobel operators, Sobel-Fieldman operators, Prewitt operators, Laplacian operators.

Project Fringe generates a spatially encoded unique phase value for every pixel on the measurement area, in which areas of phase which are not uniform constitute a process anomaly during 3D printing. Project Fringe also makes height maps. The height maps of the exposed surface are used to detect height anomalies in 1) the feedstock material layer (depressions or clumps) which contribute to final-part failures, and 2) the newly solidified layer, which contribute to final part defects and damage to the printer.

The hardware system comprises a structured light system, specifically Digital Fringe Projection (DFP). DFP is comprised of a projector, a camera, and a computer connected to each by timing, triggering and data collection circuitry controlling each and performing mathematical operations on the images captured by the camera. DFP makes 3D measurements by projecting patterns onto both the part and the feedstock material surface, recording the pattern deformation, and including spatially encoding phase onto the exposed surface, and also, separately, calculating a height map which represents the 3D surface of measurement. This height map, which is triggered before and after the laser solidification process, can reveal many different types of in-situ defects, which can eventually cause a whole-part rejection downstream. These in-situ defects include but are not limited to warping, over-melting, under-melting, thermal deformation, lack-of-fusion, recoater blade defects, build plate skew, powder short feeding, non-uniform powder coating, recoater blade hopping, powder streaks, powder depressions, part protrusions. The Project Fringe system estimates the impact of the in-situ detected defects on final part quality and makes decisions based on this estimate.

Providing these height maps, which are sensitive to these in-situ defects is valuable to all involved in building 3D printed parts. However, further added value from this measurement is gained by correlation of these in-situ defects to final-part defects. Included in the IP which we are filing is the practice of equating the in-situ defects to voids/pores in the final part. This is accomplished in two ways: firstly equating in-situ heightmaps to CT and x-ray scans of final parts and establishing a size threshold of in-situ defect sizes which, when exceeded cause void formation in the final part, and secondly using a physical model to establish these size limits in the melting or sintering or binding process. Each or both of these methods can be employed for the invention.

In one embodiment, these detected defects are compared to a library of previous 3D prints, where similar defects have been recorded and have led to final-part defects, to provide an estimate of how likely there will be a final-part defect. In-situ to ex-situ defect correlation may not be required in some embodiments.

Project Fringe comprises a Digital Fringe Projection (DFP) monitoring system may be used for Powder Bed Fusion (PBF), Binder jetting (BJ), Selective Laser Sintering (SLS) polymer Additive Manufacturing (AM). Although some of the examples described herein refer to using the Project Fringe to quantify the uncertainty of DFP height measurements, the Project Fringe may be used to provide an indication of the uncertainty associated with other types of optical or light based measurement technologies as well including digital image correlation technology, contact scanner technology, coherent light imaging technology, and the like.

In another embodiment, Project Fringe geometrically measures layer heights before and after solidification, to detect warping, powder bed defects, lack of fusion, delamination. When patterns are projected onto the part surface before and after lasing, then 3-D height maps are calculated based on pattern deformation. Project Fringe comprises a modular spatial measurement density: every pixel is a height measurement and provides micron level resolution in the height feature.

Project Fringe provides actionable information in real-time, and records the height map of each layer to detect defects, which doesn't require immense data storage or analysis. Project Fringe measures a different feature (height maps of powder bed and melted layer). Project Fringe provides estimations of part quality in real-time ("go/no-go" decisions).

Project Fringe calculates accuracy of each point of measurement, uses previous data regarding final part defects to estimate existence of internal defects based on in-situ topography, operably couples to existing printers via mounting mechanism, uses a neutral density filter on the camera, uses algorithms which filter the images before creating the phase map which is in one embodiment subsequently converted to topography, and estimates part density based on phase or topography information.

Figure 1:
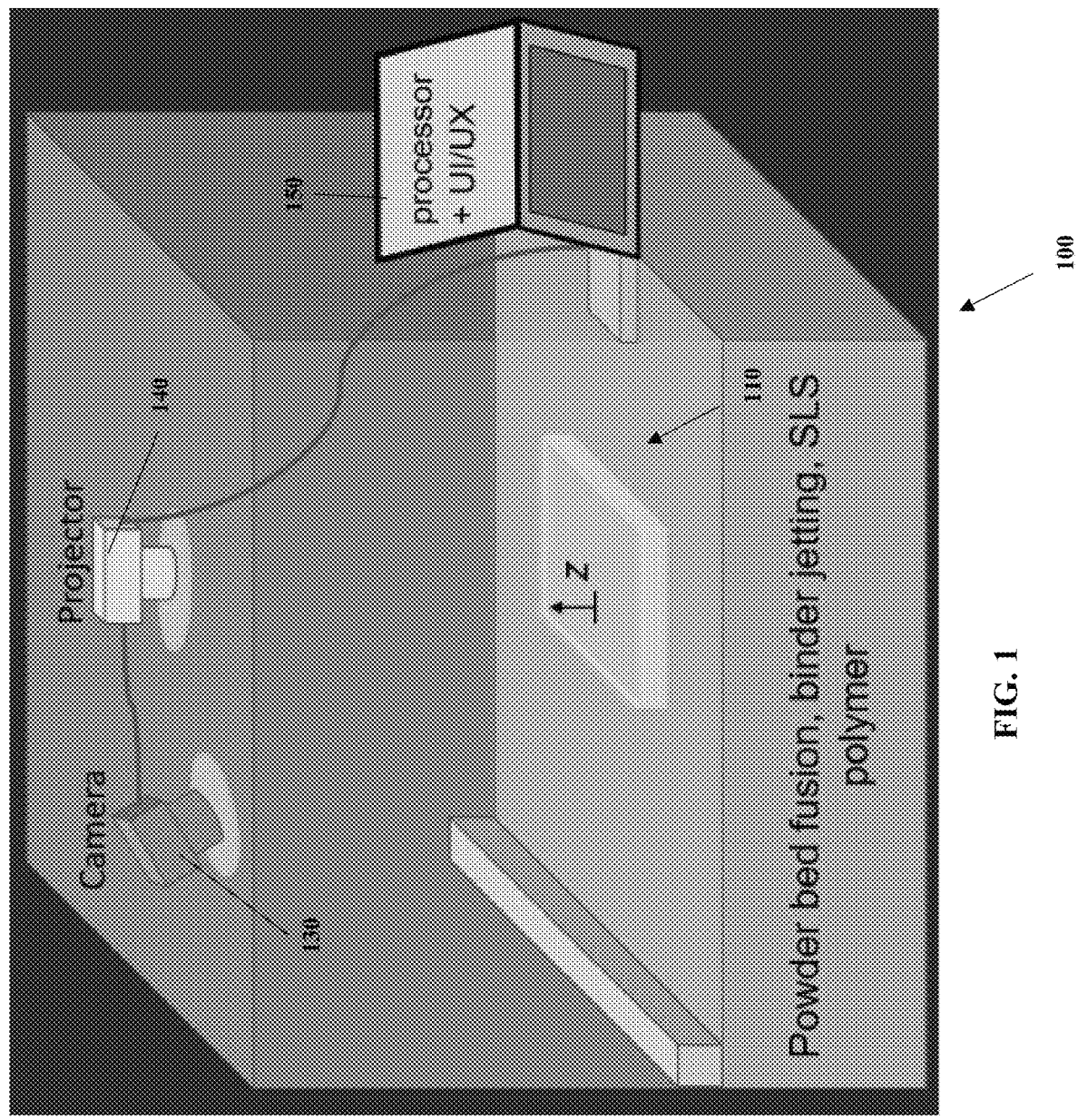
FIG. 1 is an example of an additive manufacturing system, in accordance with some example embodiments.

In one embodiment, the Project Fringe attaches to the inside or outside of the 3D printer chamber 110, as shown in FIG. 1. A computer will be used to calibrate the measurement system. The monitoring system computer triggers projection and camera image capture and processes images. There can be any number of cameras used in the fringe projection measurement. A projector provides different projections, which can be overlayed simultaneously with different fringe wavelengths. Also, the wavelength of the light projected may also be changed during or before projection. The projector may be a light source and may be placed in certain locations both within and outside of the 3D printer chamber. Moreover, there may be a plurality of cameras, projectors, and/or interferometers. The camera may be an image sensor, imaging structured light, such as a fringe, that is projected on the surface of an object being measured. The camera position may be kept constant at a viewing angle. Pixel patch spacing may be on the order of microns. The output triggering functionality of the projector triggers camera image acquisition to capture fringe images at uniform intervals to eliminate projector "draw lines" which occur without synchronization. To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide interaction with a user as well, such as a mobile cellular phone or portable computer, or tablet. For example, feedback provided to the user can be any form of sensory feedback, such as for example visual feedback, auditory feedback, or tactile feedback; and input from the user can be received in any form, including, but not limited to, acoustic, speech, or tactile input.

DFP height measurements are made by projecting patterns onto a flat reference plane (physical or mathematical, denoted further with subscript "r"), then placing an object onto the scene, and recording how the projected patterns deform from the object's shape (denoted further with "o"). Resultant calculations of the deformation of the fringe patterns produce a phase map, which is then converted to a height map through a calibration routine. During in-situ measurements inside a PBF machine, the reference surface can be taken as the bare base plate, or the base plate with a uniform initial powder coat. If DFP geometries are expected to stay constant, the reference phase map can be mathematically produced to allow differential height measurements independent of any height profile of the reference surface.

Examples

The following examples are put forth so as to provide those of ordinary skill in the art with a complete disclosure and description of how the compounds, compositions, articles, devices and/or methods claimed herein are made and evaluated, and are intended to be purely exemplary of the invention and are not intended to limit the scope of what the inventors regard as their invention. However, those of skill in the art should, in light of the present disclosure, appreciate that many changes can be made in the specific embodiments which are disclosed and still obtain a like or similar result without departing from the spirit and scope of the invention. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

In polymeric Powder Bed Fusion (PBF) Additive Manufacturing, of which Selective Laser Sintering is an example, the shrinkage is easily visible to the naked eye with good shrinkage being an indicator of good sintering and a stable process. In SLS the powder bed is preheated to approximately 80% of the material's melting temperature. The laser power adds the remaining ~20% of the energy to cause sintering.

Powder recycling is a key part of the polymeric-PBF processes such as SLS. In SLS powder that is recovered from a build after the parts have been removed is often refreshed by blending in new unused powder (virgin powder) and discarding a fraction of the used powder to waste. This is done to ensure that the powder used in the build has the correct properties to ensure a stable build process as the powder is subject to multiple heat soaks during multiple builds leading to crystallinity changes and making it more difficult to melt or sinter the powder. If virgin powder is not blended into the recycled batch then the user is forced to increase the build chamber preheat temperature or increase the laser power to enable good melting and good part production. Eventually if no virgin powder is added to the recycled material the batch becomes un-processible and has to be discarded to waste.

As shrinkage is a key indicator of good melting, then if it can be measured to a known level of uncertainty then it can be used to allow a user to either monitor build quality and/or adjust machine settings by way of control feedback loops or make decisions based on knowledge to scrap or blend reused powder. Upper surface roughness of the consolidated material may also provide a key indicator of build quality.

Metal laser and E Beam PBF AM are similar to polymeric PBF systems in their operation, but do not require as much, if any powder recycling. This is because there is little change in powder properties over time in contrast to the polymeric PBF and the majority of the energy to melt the powder is derived from either the EBeam or the laser not the preheating of the powder.

Inkjet binding systems rely on the dropping of binder onto the surface of the part, where several additional mechanisms come into play. As the binder is dropped, the binder soaks into the powder. As the binder soaks into the powder, the binder draws the loose powder bed together creating shrinkage. The data showing the binder and powder shrinkage is shown in FIGS. 4A-4F.

In inkjet binding systems, if there is too much binder, then a meniscus will form on the powder surface. In inkjet binding systems, if there is too little binder, then the surface will not shrink properly. Therefore, in inkjet binding systems, a proper soak and ultimately shrinkage will have a characteristic optimal drop in the surface. The method and system described here detects and optimizes for this shrinkage and can be used for controlling inkjet printer performance.

Figure 2:
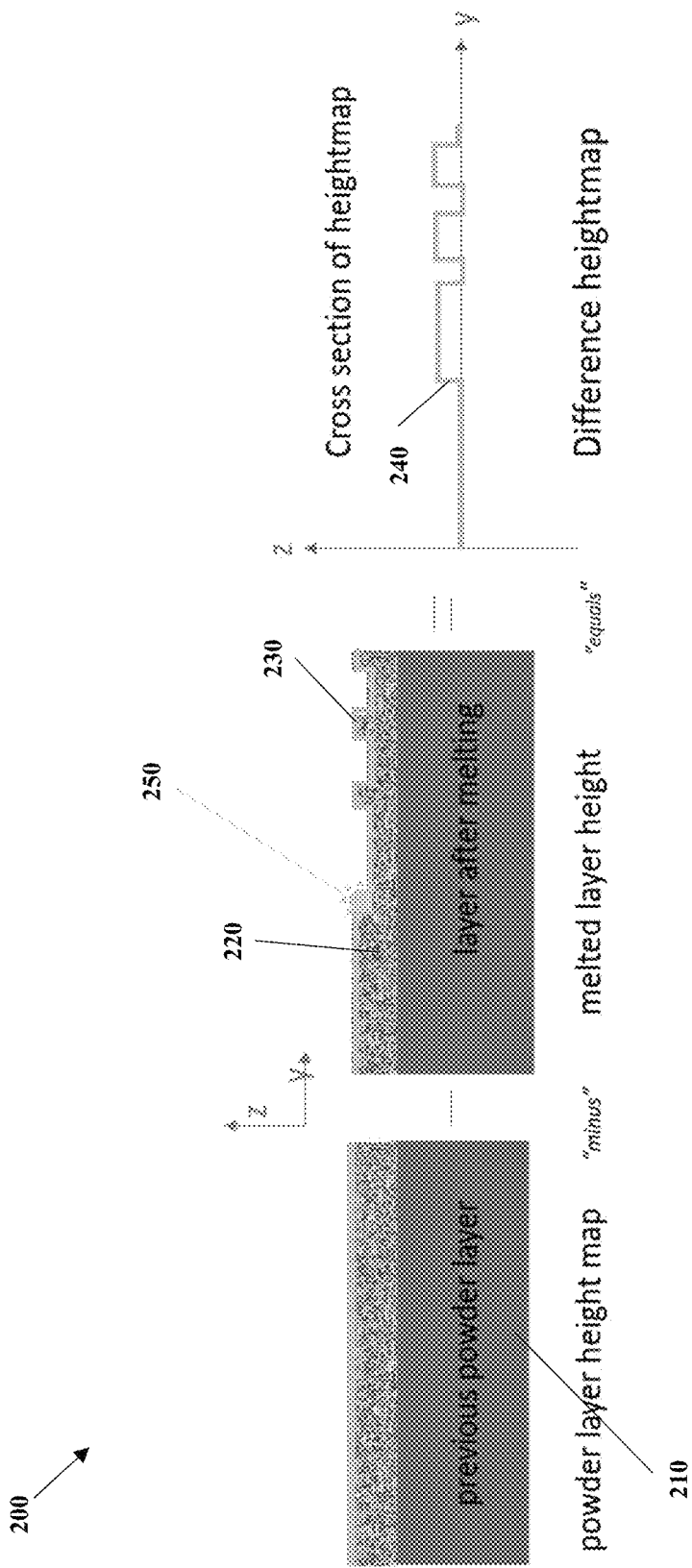
FIG. 2 is a schematic diagram showing the difference map of the un-melted powder area and the post-melt surface area.

As shown in FIG. 2, the method to detect shrinkage and to estimate in-process print quality 200 comprises measuring a height difference 240 between a deposited layer 210, an unfused material 220, and a solidified/fused material 230. A sensing apparatus 250 measures the height difference 240 and is comprised of a camera and illumination system, according to one embodiment. In one embodiment, the height difference is between about 1 micron and about 10 microns, alternatively, between about 2 microns and 8 microns, alternatively, between about 3 microns and about 6 microns, alternatively, about 4 microns. In another embodiment, the sensing apparatus is a contact imaging device or a laser line profilometer. The amount that the layer reduces when melted is shown in FIG. 2. In one embodiment, the amount of the layer reduction is between about 10 microns and about 80 microns, alternatively, between about 15 microns and about 70 microns, alternatively, between about 20 microns and about 60 microns.

In one embodiment, the method and system comprise evaluating the powder health based on how much the height reduces in powder bed fusion, electron beam fusion, or polymer sintering.

In one embodiment, the method and system comprises a feedback loop for the chamber temperature from the shrinkage measurement to control the melting of recycled powder. A temperature sensor may detect the ambient chamber temperature, according to one embodiment.

In one embodiment, the method and system comprises a feedback loop for the laser power to control the melting of recycled powder. In one embodiment, the laser power is measured or sensed from the laser system.

In one embodiment, the method and system comprises observing the powder layer of binder jetting power height reduction after the binder is added. In one embodiment, the method and system comprises observing the height increase between the melted/solid layer (and binded layer) and the next layer of unfused powder.

In one embodiment, the method and system comprise estimating post-build part quality based on the measurements of the height difference between a deposited material, an unfused material, or a solidified/fused material. The method and system comprise measuring the height difference between a deposited unfused material and the solid layer beneath, measuring the height difference between an unfused material, and a solidified-sintered/melted, or a bound material. The method and system further comprise estimating a percentage of porosity, grain structure, and mechanical properties and using these estimates to infer part quality. In one embodiment, percent density ranges between about 99% to about 100%, porosity range is between about 0% and about 1%. In one embodiment, the grain structure varies from martensite to austenite, and the grain size distribution ranges from about 0.5 µm to about 500 µm. Mechanical properties include tensile strength, ultimate yield strength, fatigue life, percent elongation, or cracking. Binder jetting density varies between about 75% and about 95%.

In one embodiment, estimating the percentage of porosity, grain structure, and mechanical properties is completed using a physics-based computer model. In one embodiment, estimating the percentage of porosity, grain structure, and mechanical properties is done using a library of previous measurements and/or a neural network, Gaussian process regression, convolutional kernels, and the like.

A neural network (NN), in the case of artificial neurons is called an artificial neural network (ANN) or simulated neural network (SNN), is an interconnected group of natural or artificial neurons that uses a mathematical or computational model for information processing based on a connectionistic approach to computation. In most cases, an ANN is an adaptive system that changes its structure based on external or internal information that flows through the network. In more practical terms neural networks are non-linear statistical data modeling or decision making tools. They can be used to model complex relationships between inputs and outputs or to find patterns in data.

Gaussian process regression is nonparametric (i.e. not limited by a functional form), so rather than calculating the probability distribution of parameters of a specific function, GPR calculates the probability distribution over all admissible functions that fit the data.

In convolutional kernels or convolutional neural networks, the kernel is nothing but a filter that is used to extract the features from the images. The kernel is a matrix that moves over the input data, performs the dot product with the sub-region of input data, and gets the output as the matrix of dot products.

In one embodiment, the method and system comprises using the height measurement to estimate the amount of powder lost to ejection and evaporation during consolidation and using the height measurement to optimize performance. In one embodiment, the amount of powder lost is in metal additive manufacturing.

Figure 3:
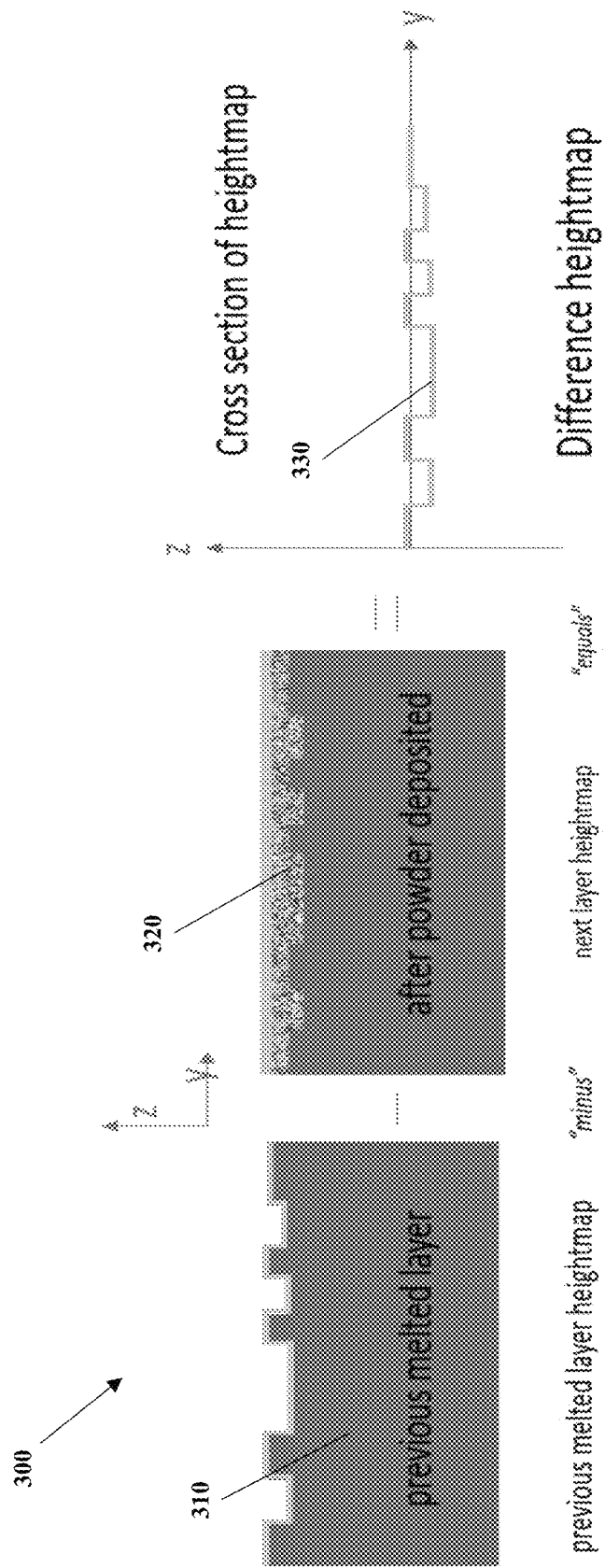
FIG. 3 is a schematic diagram of the difference map of the newly deposited powder layer and the previous melted layer.
Figure 4A:
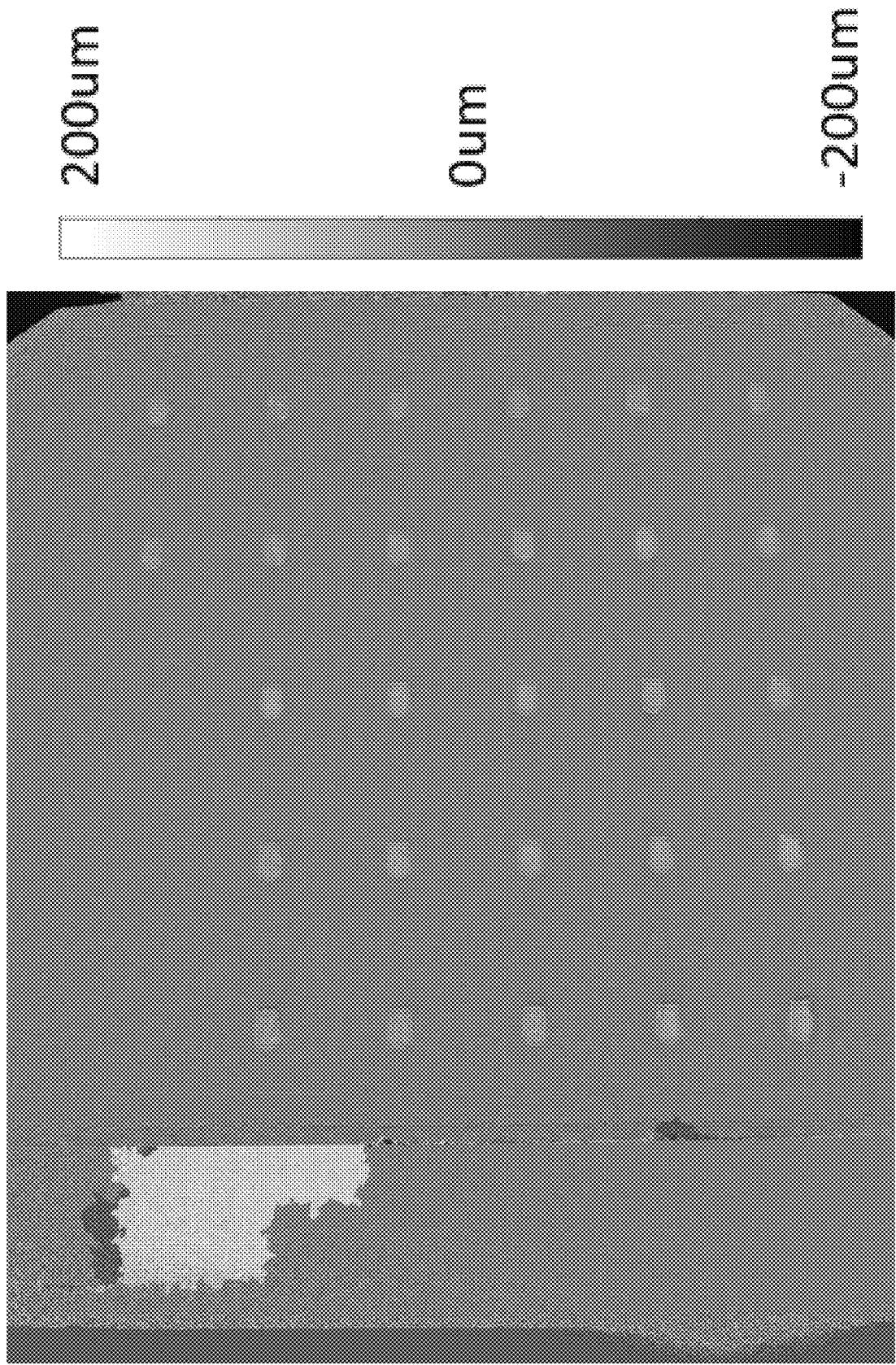
FIGS. 4A-4F are height measurements data showing the powder height shrinkage after melting.
Figure 4B:
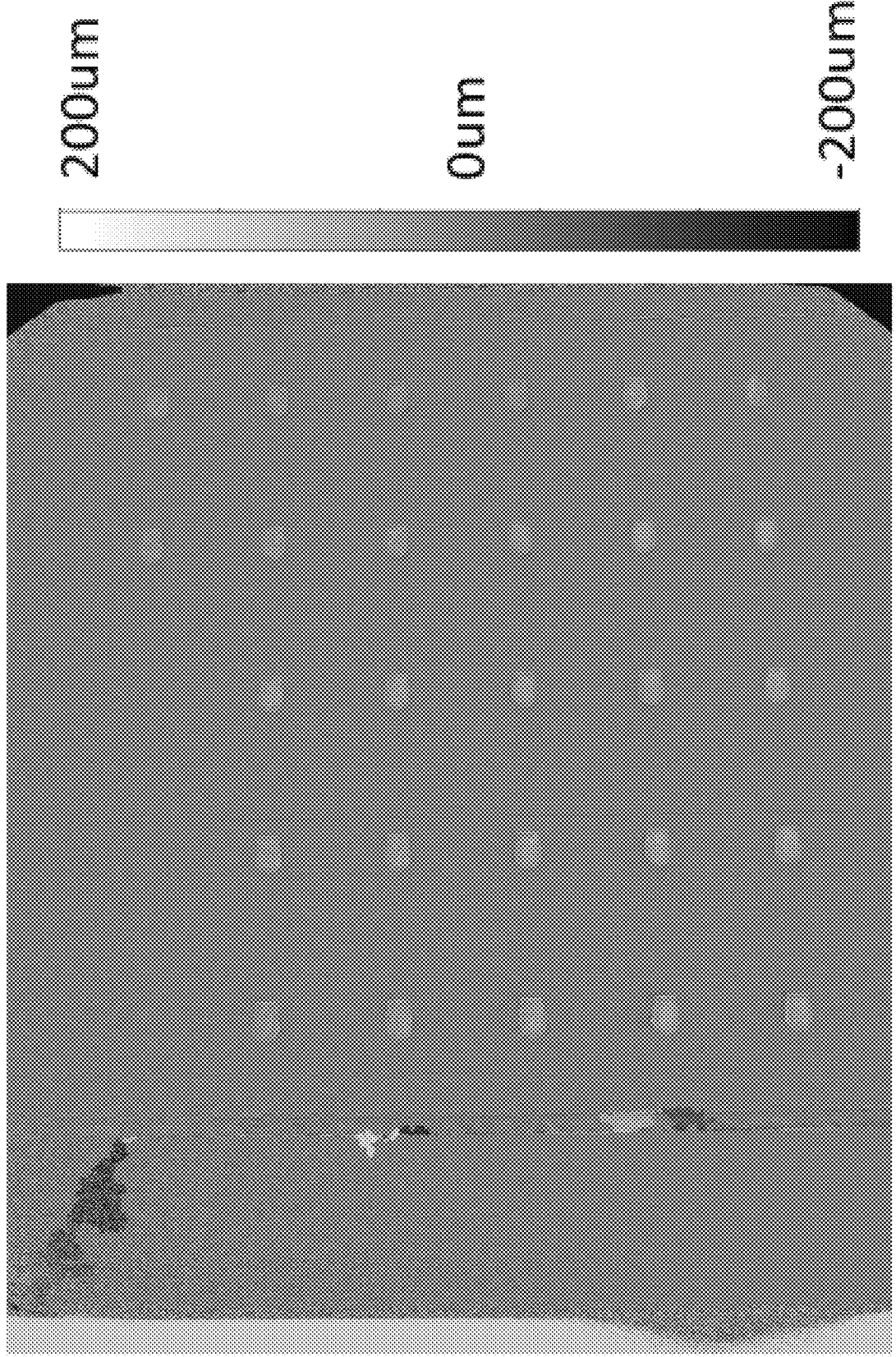
Figure 4C:
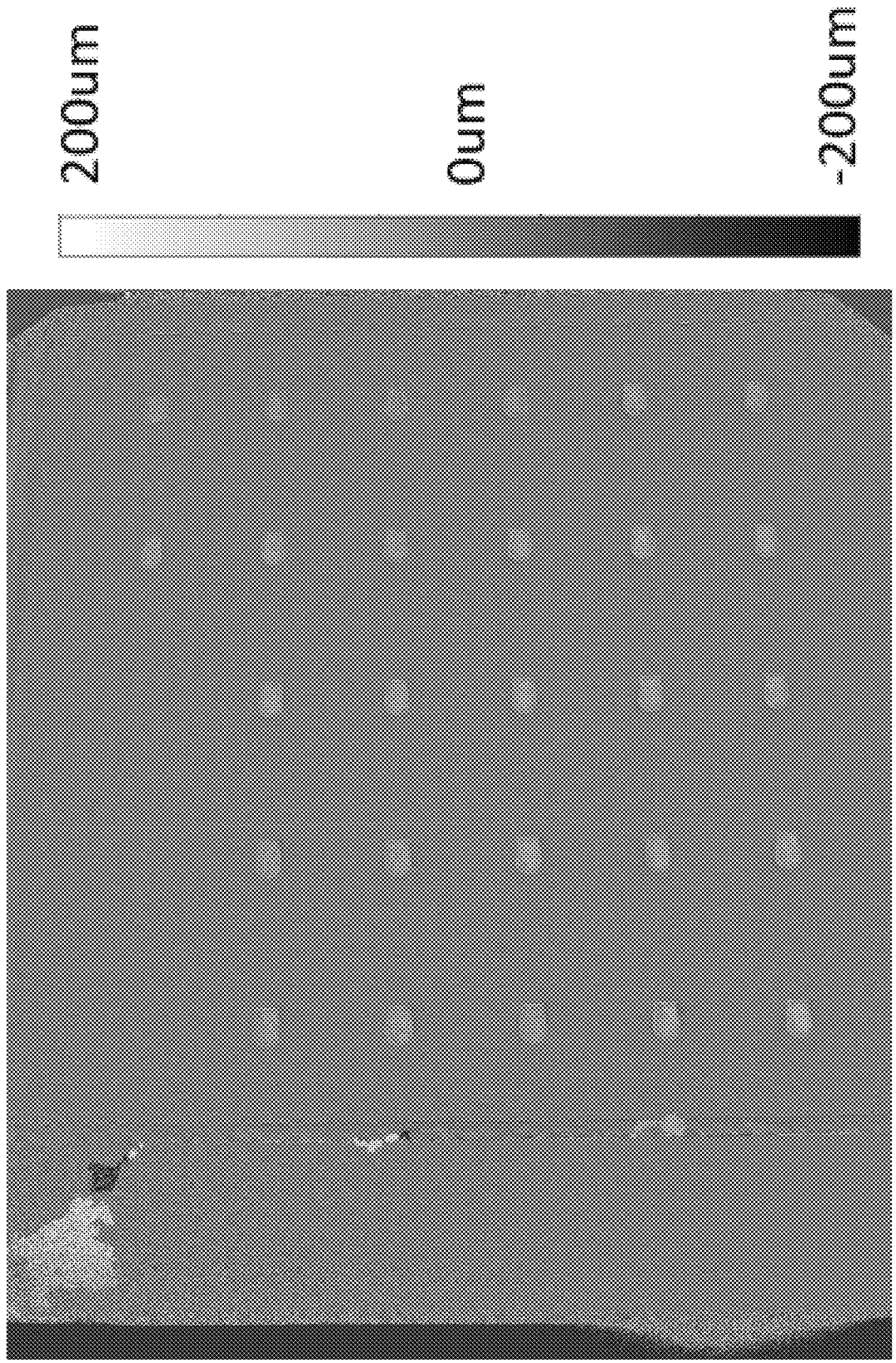
Figure 4D:
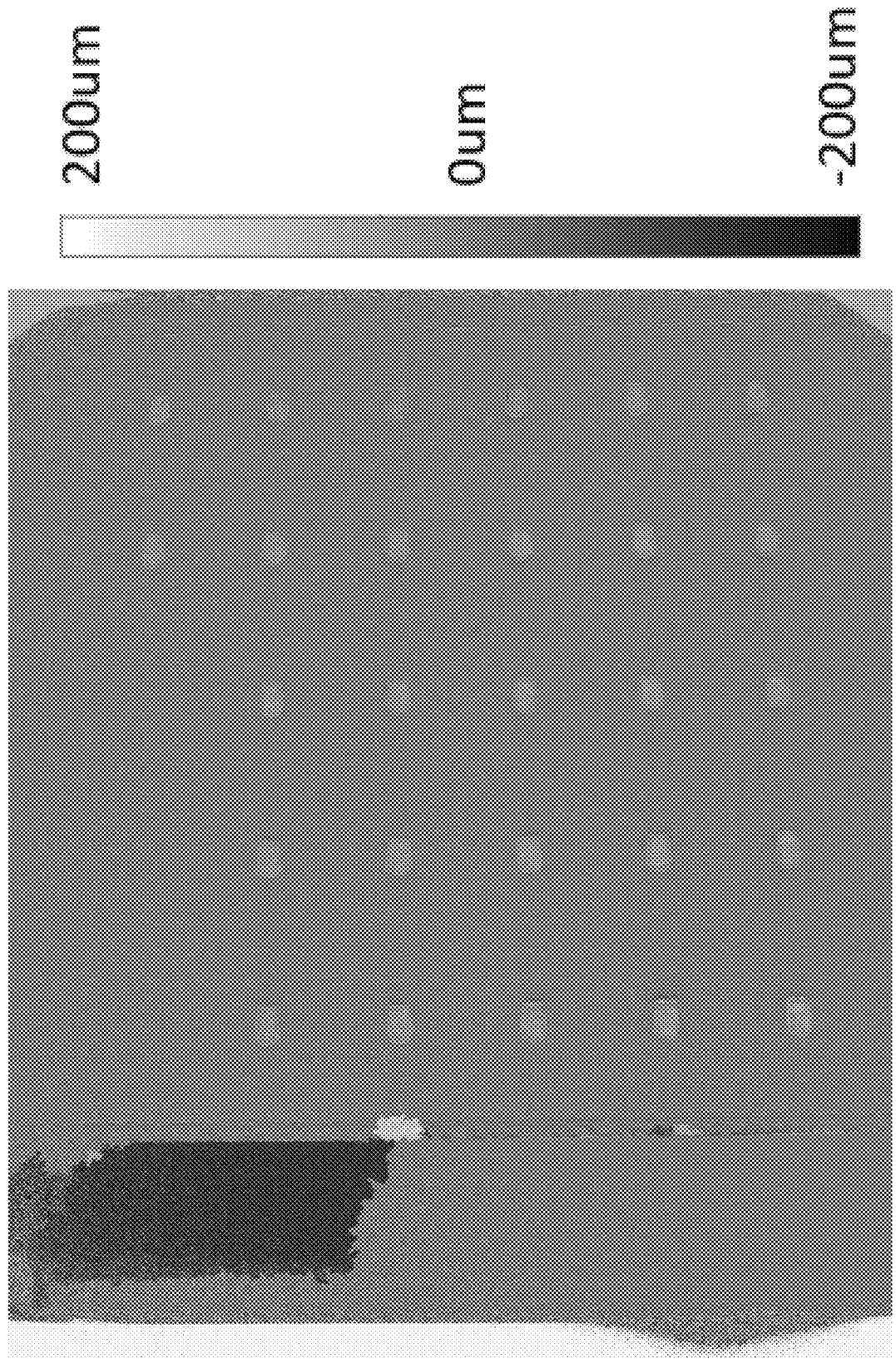
Figure 4E:
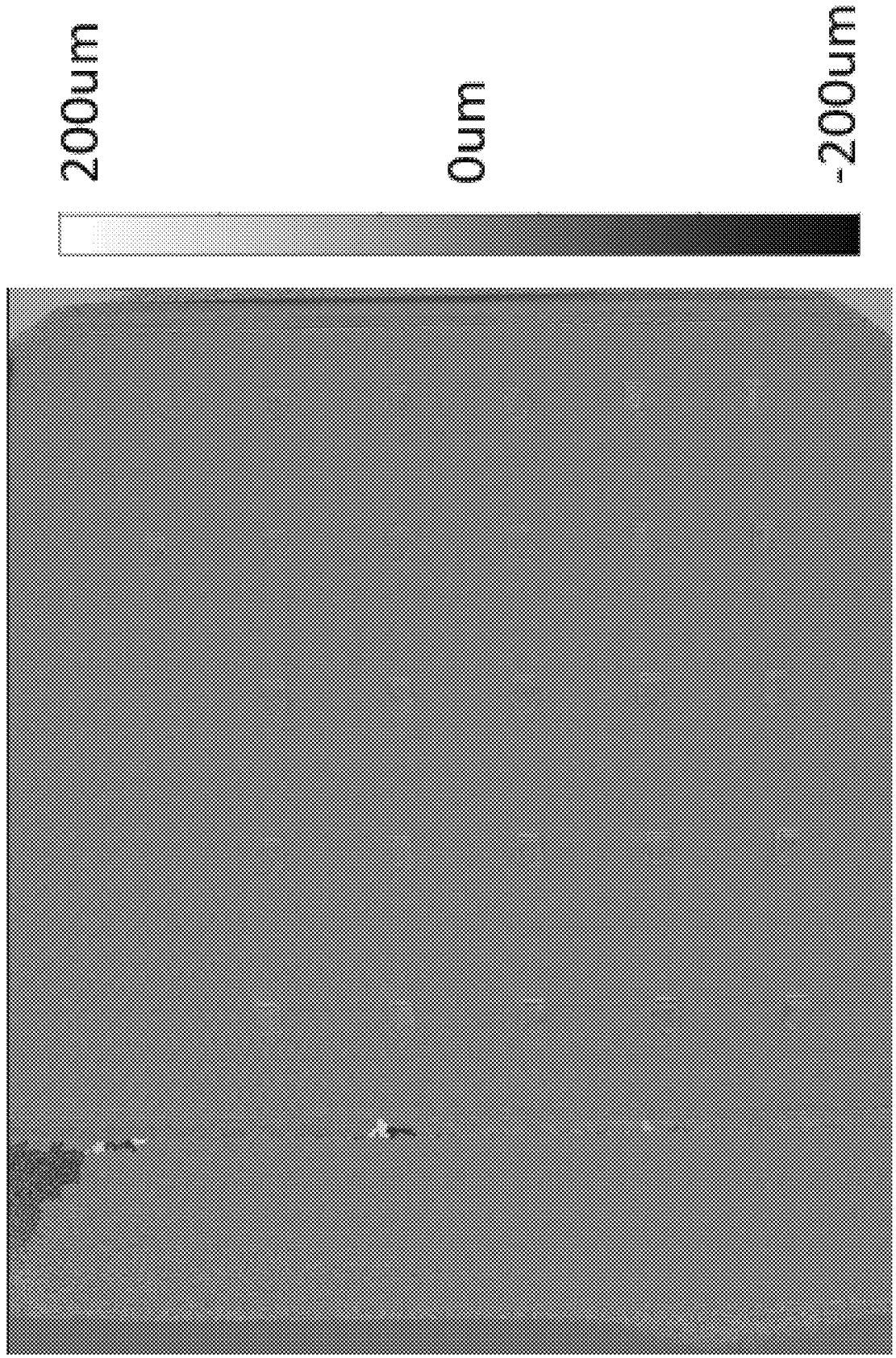
Figure 4F:
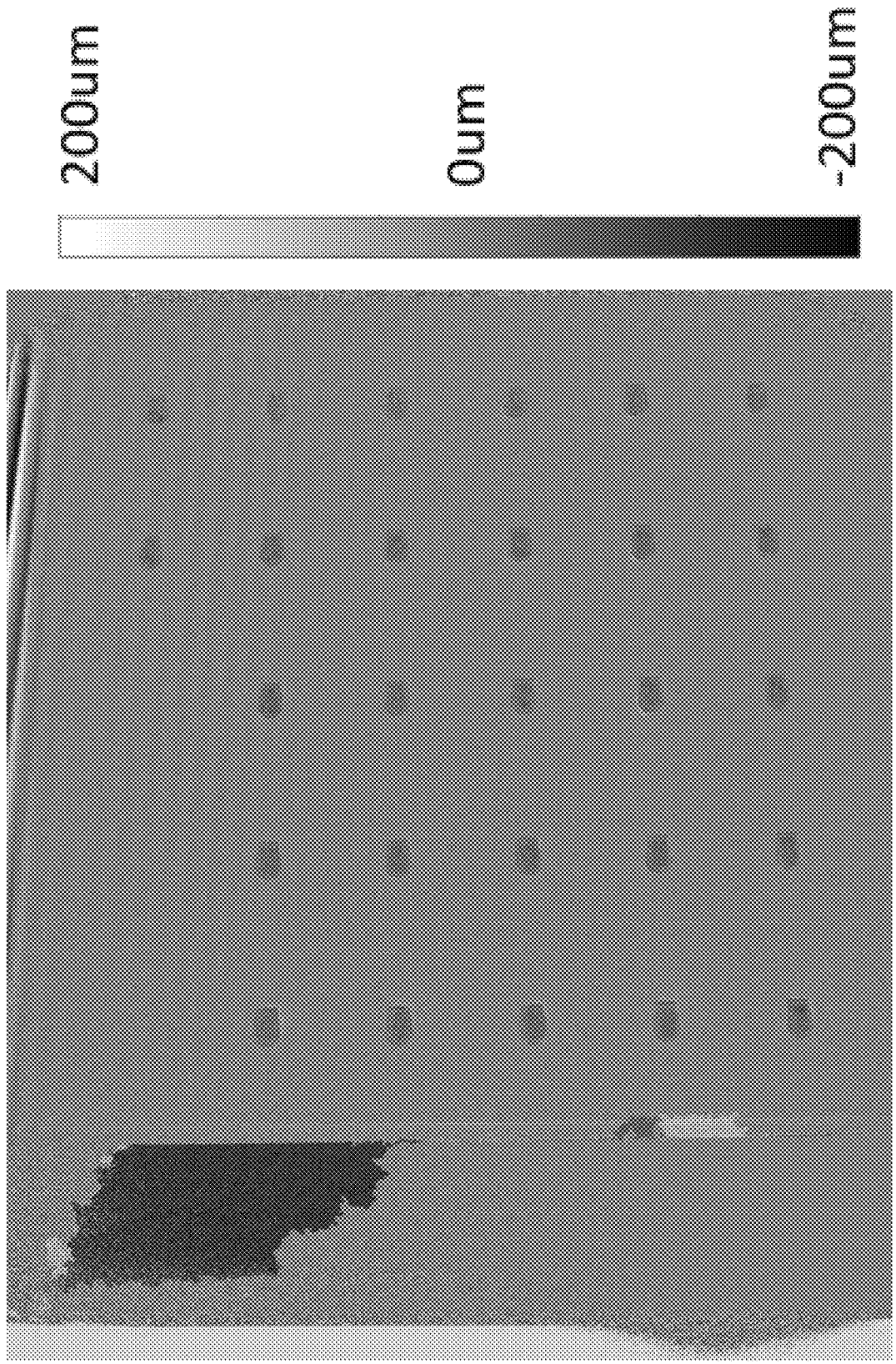

As shown in FIG. 3, a method to estimate a recoating packing factor 300 comprises measuring a height deposited and an unfused material and measuring the difference between a previous melted layer 310, and a newly deposited layer 320 and determining how well the next layer was packed through a height map 330. In one embodiment, packing is measured by the percent reduction and the height shrinkage.

Information about the Neural Network and Physical Model to Estimate Defects

Track record in AM. GPR models have recently seen successful prediction of porosity of laser powder bed fusion parts using in situ measurements from a Renishaw AM 500M machine [10]. A GPR model was trained to predict porosity using in situ features. Tests were conducted over a wide range of densities, realizing the results shown in FIG. 17 and reported RMS error less than 4%.

Uncertainty quantification, the AI must provide some form of uncertainty quantification. An advantage of GPR models over neural networks is that they are probabilistic and naturally provide confidence bounds on their predictions without significant additional compute; the results shown in FIGS. 17-18, show a GPR model's uncertainty bounds.

Scalability. In situ AM data (and CT images) can be of significant size (often GB per build), and the AI model must scale well with the size of the training data. GPR models include a product-of-experts approach, allowing them to scale to large datasets without specialized computing architectures[11]. Rather than train a single GPR, which is expensive on large datasets, training data is divided equally K different "AI experts" to predict part-porosity from in situ data;

the final prediction is a weighted combination of the predictions made by each AI expert. Crucially, such an approach does not require all experts to be in memory simultaneously, circumventing RAM limitations which are the bottleneck for many AI approaches.

Out-of-data performance. Post model training, a build may be conducted where phenomena occur that did not occur during the generation of the training data. In such a case, where the AI model is being applied in a new scenario that is not represented by the training data, GPR models have the advantage that they fail gracefully when applied far out-of-data, and predictive confidence bounds will expand considerably. This is preferable to other approaches, including Neural Networks, which are prone to providing estimates that are confidently wrong when applied outside of their training data[12].

FIG. 18 illustrates the processes required to initialize the GPR models. Builds will be undertaken using the Renishaw AM400, during which time in situ measurements (i.e. Project Fringe heightmap data, visual images) will be collected alongside data from the machine's print logs. Post-build, a CT scan of the built component will be conducted. The in situ data will then be position matched with the CT data using least squares matching for 3D data. It is expected that the CT results will be higher resolution than the in situ measurements and, as such, each in situ measurement will be associated with the averaged value of surrounding CT data. This process will generate a set of input-output pairs where inputs are in situ measurements and outputs are corresponding measures of porosity, obtained from the CT results. This data will then be split between several GPR "expert" models, avoiding the large computational overheads of training a single GPR model on a large dataset.

Gradient-based algorithm training was undertaken to obtain maximum likelihood parameter estimates. Data was split into k evenly sized sets, such that k−1 data sets can be used for model training, leaving the remaining set for validation. Model testing was conducted over k iterations where, at each iteration, a different combination of testing a training data sets will be used. Final model performance will be judged by averaging over the ensemble of tests; a process known as k-fold cross-validation. Model performance was measured using the Area Under Curve approach i.e. the area underneath Receiver Operating Characteristic (ROC) curves that are obtained when varying the model's threshold decision value (the value above which it is decided that a part contains porosity based on the results of the model). ROC curves were used to analyze model performance over the full range of possible thresholds. These tests was repeated k times where, for each test, the roles of training and testing data are swapped following a k-fold cross validation procedure.

Figure 5:
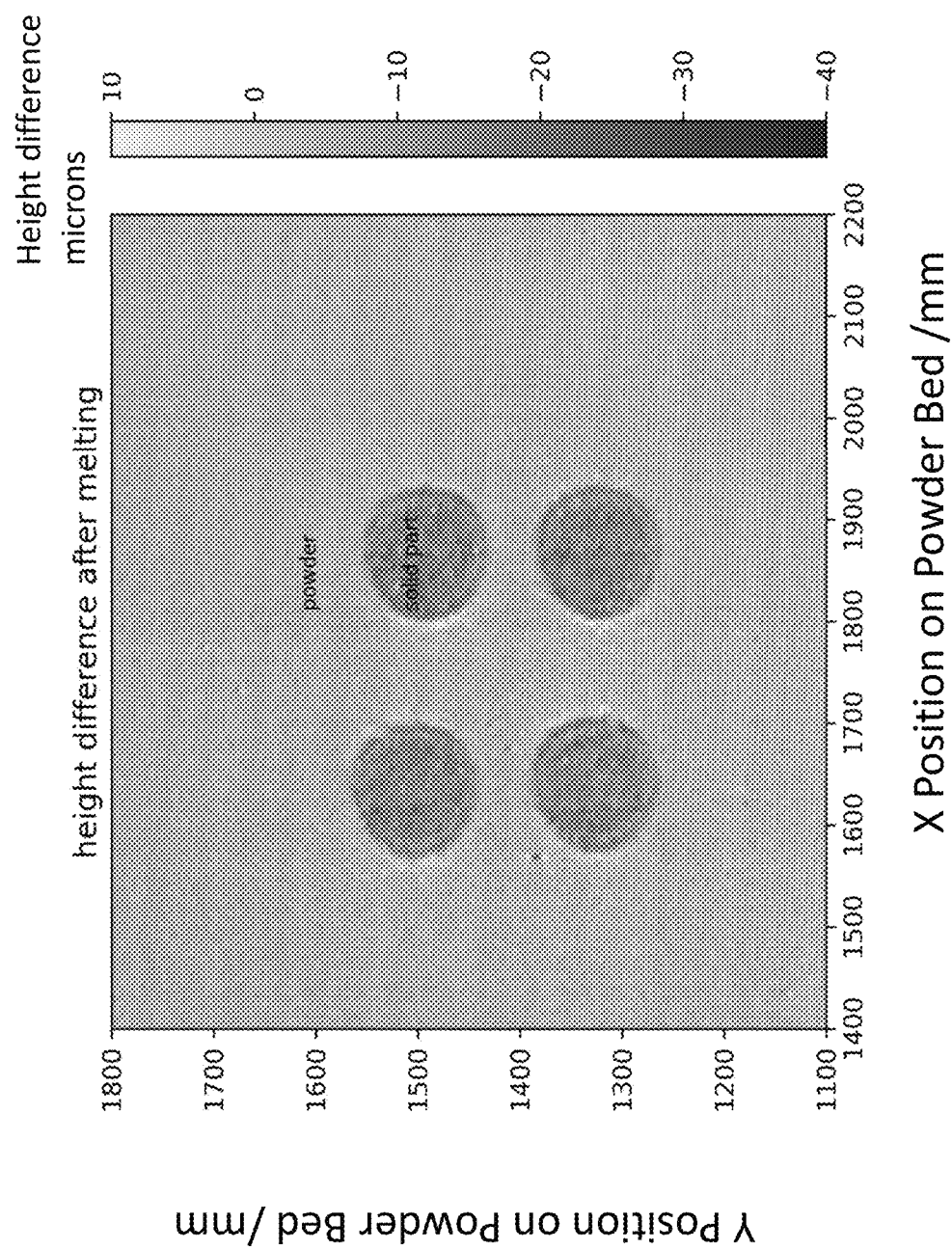
FIG. 5 is a Coloured 3D Point Cloud (Process L-PBF) graph showing the typical Height map difference, showing the powder surface height minus melted surface height and showing the features of an unfused powder bed and melted area surface texture and height variation.

FIG. 5 is a Coloured 3D Point Cloud (Process L-PBF) graph showing the typical Height map difference, showing the powder surface height minus melted surface height and showing the features of an unfused powder bed and melted area surface texture and height variation.

Figure 6:
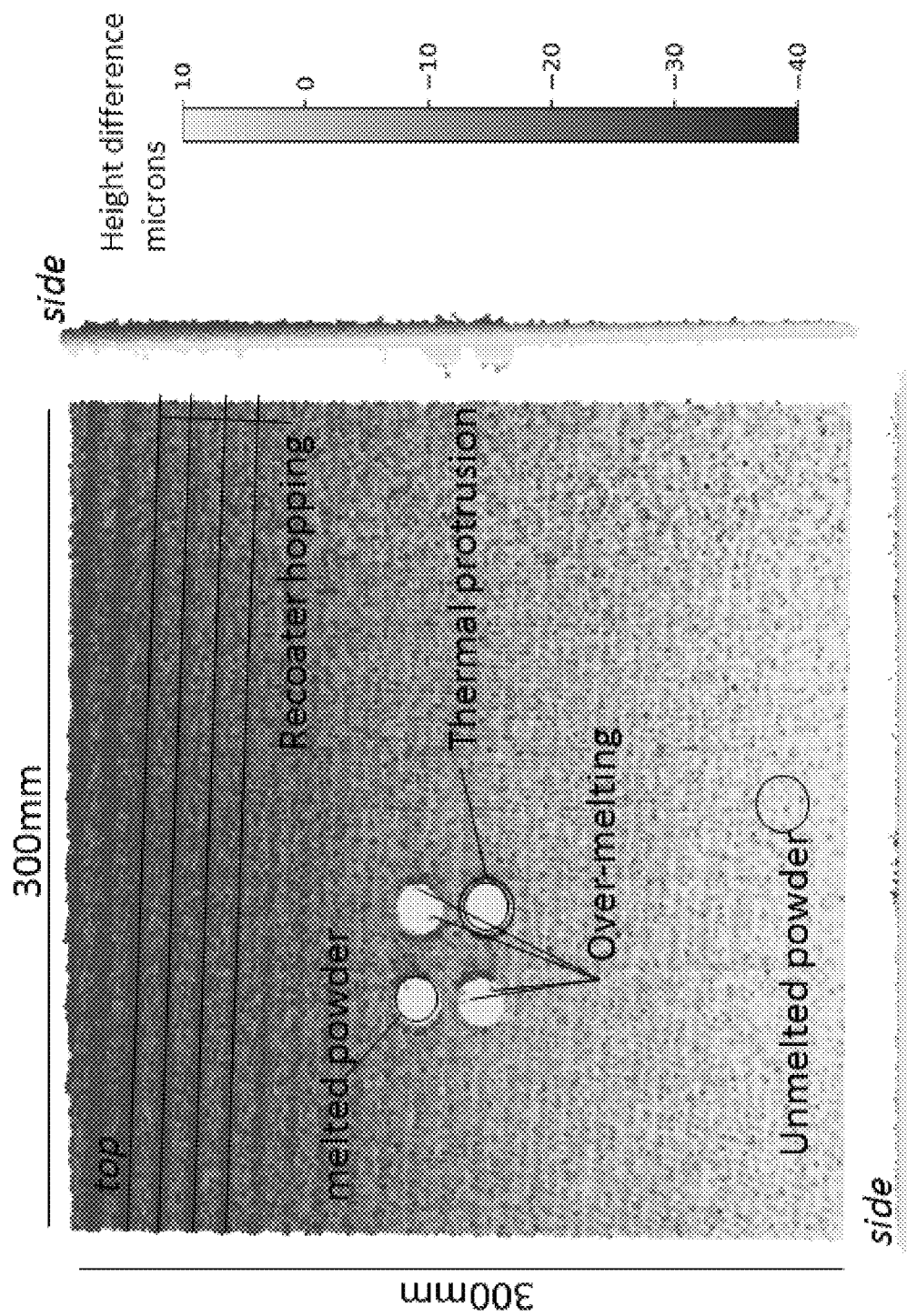
FIG. 6 is a Coloured 3D Point Cloud (Process L-PBF) graph showing the Typical Heightmap difference. Powder surface height minus melted surface height, general features of Unfused powder bed, Fused part, showing the anomalies/defects including Overmelting, thermal protrusion, recoater vibration/hopping, powderbed thickness variation.

FIG. 6 is a Coloured 3D Point Cloud (Process L-PBF) graph showing the Typical Heightmap difference. Powder surface height minus melted surface height, general features of Unfused powder bed, Fused part, showing the anomalies/defects including Overmelting, edge protrusion, recoater vibration/hopping, powderbed thickness variation.

Figure 7:
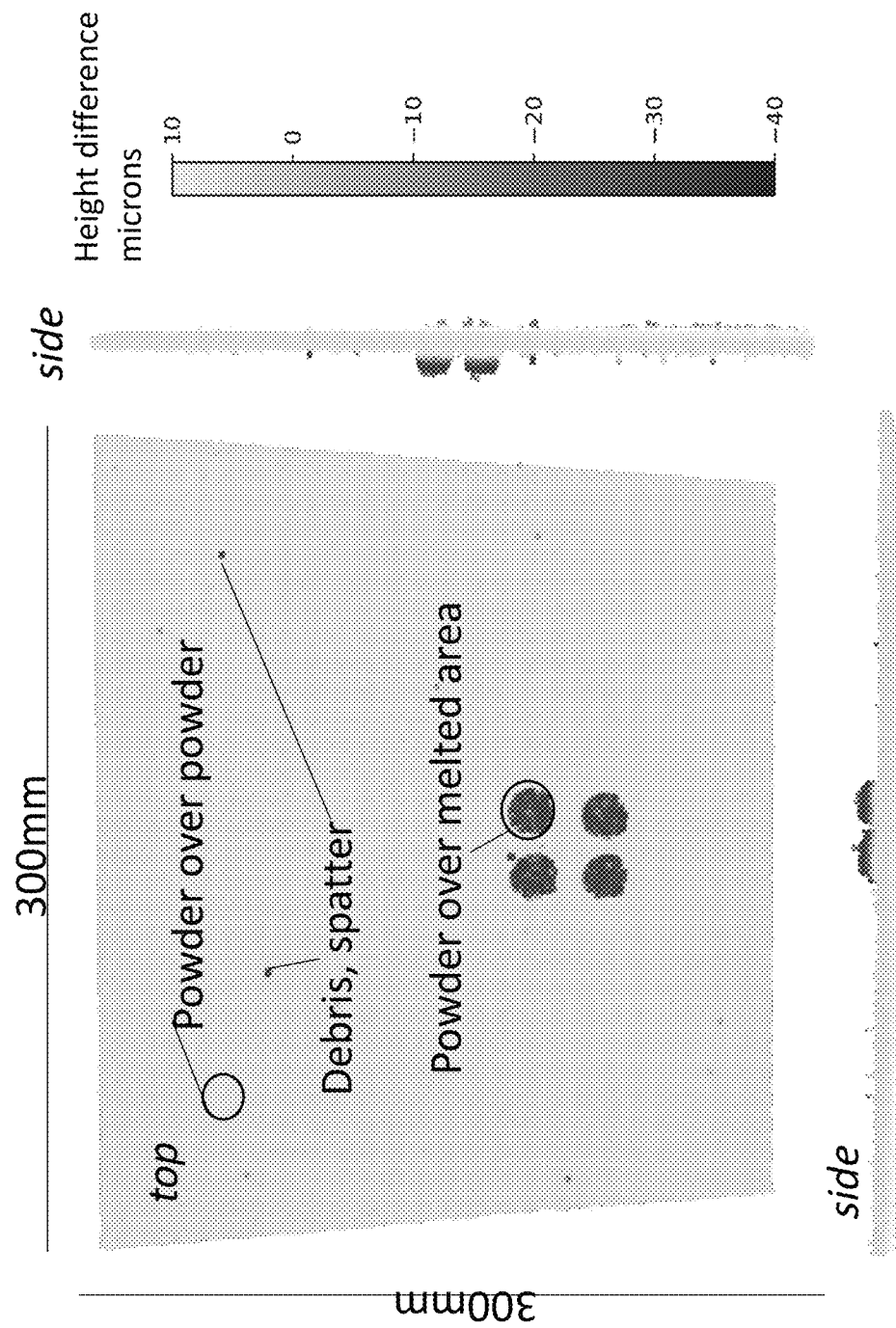
FIG. 7 is a Coloured 3D Point Cloud (Process L-PBF) graph showing the typical Heightmap difference and the Melted surface height minus next powder surface height; the general features observed include the Powder bed thickness both over the part (powder over melted area) and over the unfused powder bed (powder over powder); and the anomalies/defects observed include Spatter and debris, variation in layer thickness.

FIG. 7 is a Coloured 3D Point Cloud (Process L-PBF) graph showing the typical Heightmap difference and the Melted surface height minus next powder surface height; the general features observed include the Powder bed thickness both over the part (powder over melted area) and over the unfused powder bed (powder over powder); and the anomalies/defects observed include Spatter and debris, variation in layer thickness.

Figure 8:
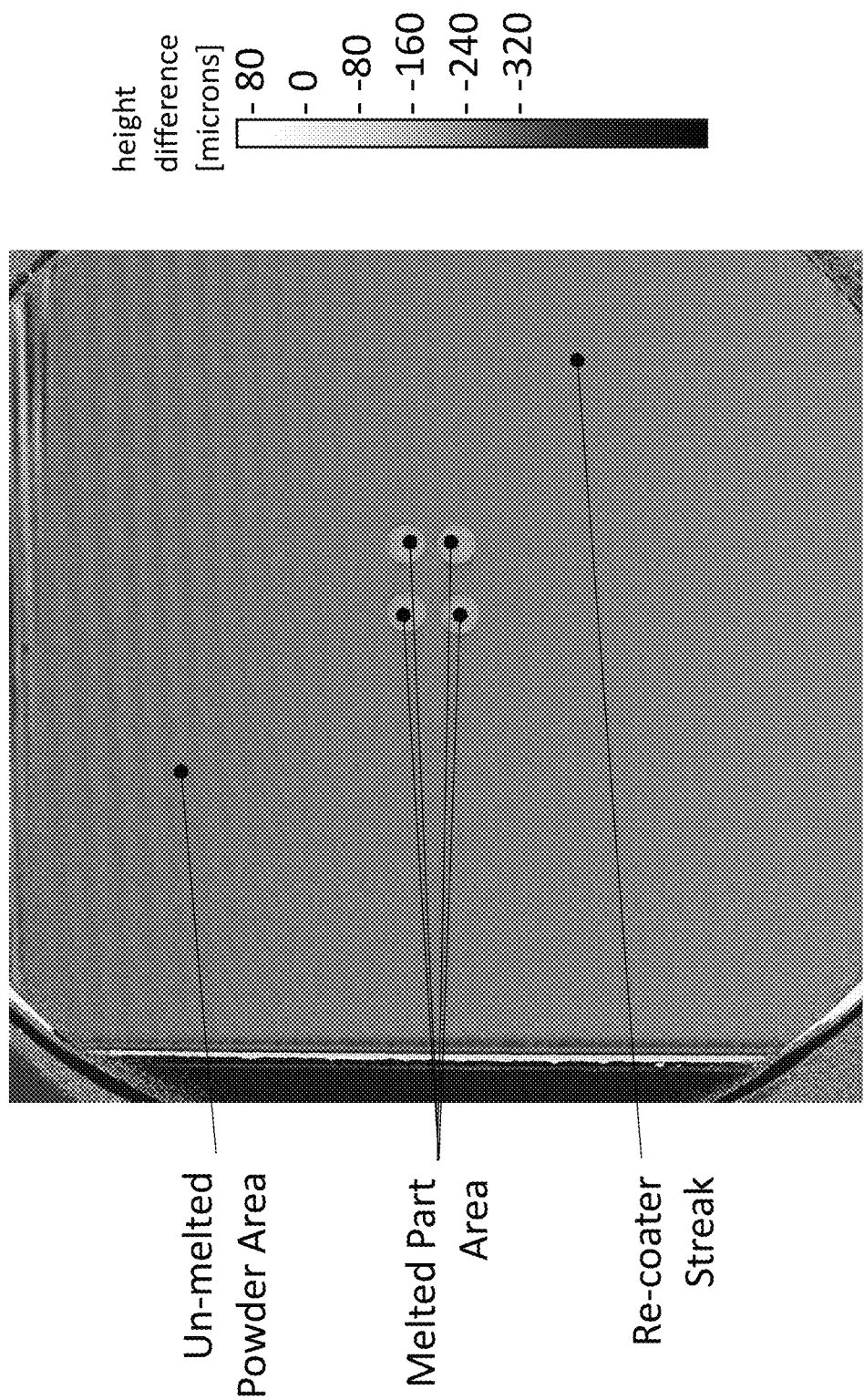
FIG. 8 is a Greyscale 3D Point Cloud (Process L-PBF) graph showing the typical Heightmap difference, Post Melt Heightmap MINUS Next Powder Layer; the General features observed include the Powder bed and melted part surface morphology; and the Anomalies/defects observed include Recoater Streak.

FIG. 8 is a Greyscale 3D Point Cloud (Process L-PBF) graph showing the typical Heightmap difference, Post Melt Heightmap MINUS Next Powder Layer; the General features observed include the Powder bed and melted part surface morphology; and the Anomalies/defects observed include Recoater Streak.

Figure 9:
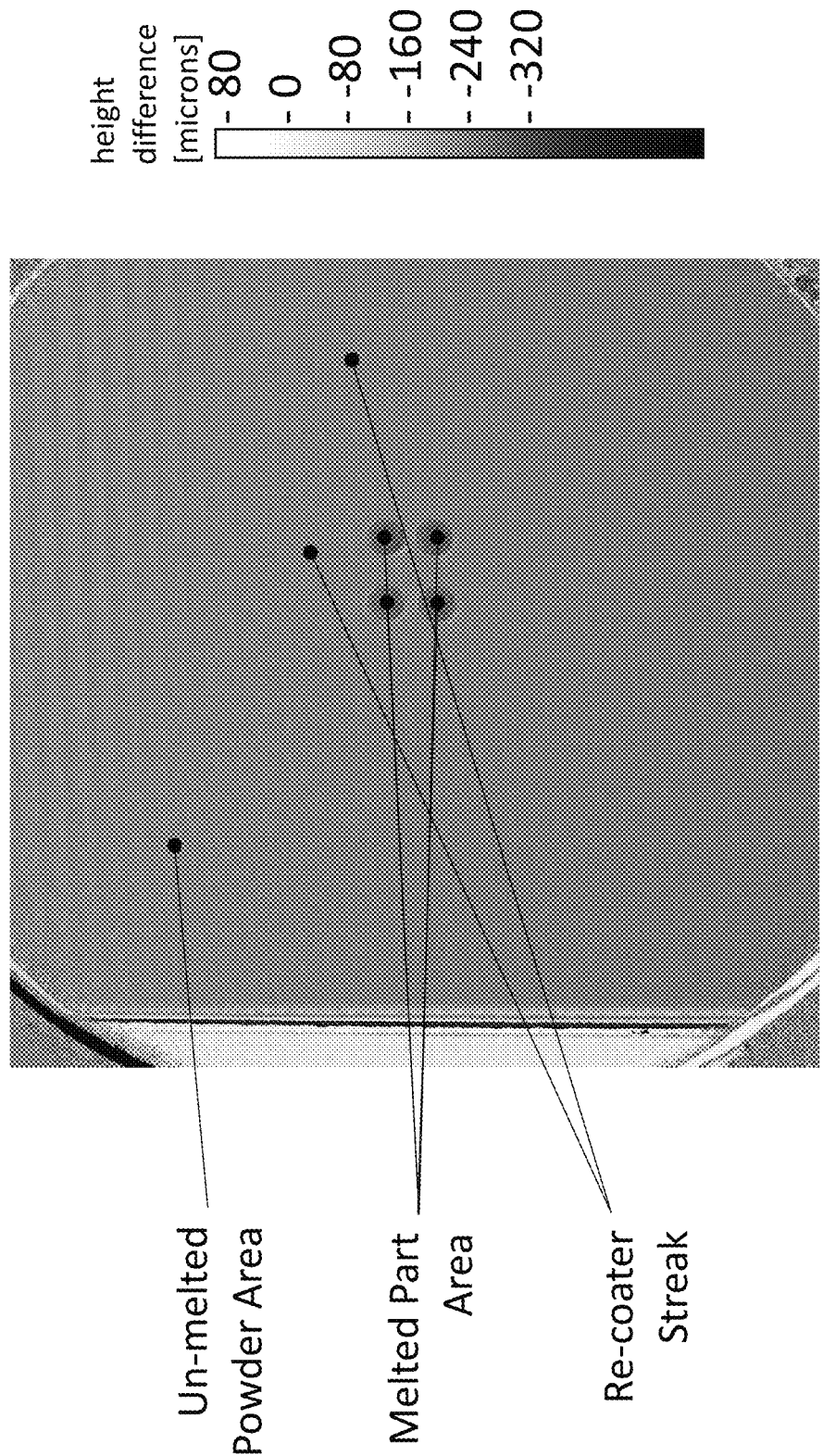
FIG. 9 is a Greyscale 3D Point Cloud (Process L-PBF) graph showing the Heightmap difference Based Analysis, Powder Layer MINUS Next Post Melt Heightmap; the General features observed include the Powder bed and melted part surface morphology; and the Anomalies/defects observed include the Recoater Streak.

FIG. 9 is a Greyscale 3D Point Cloud (Process L-PBF) graph showing the Heightmap difference Based Analysis, Powder Layer MINUS Next Post Melt Heightmap; the General features observed include the Powder bed and melted part surface morphology; and the Anomalies/defects observed include the Recoater Streak.

Figure 10:
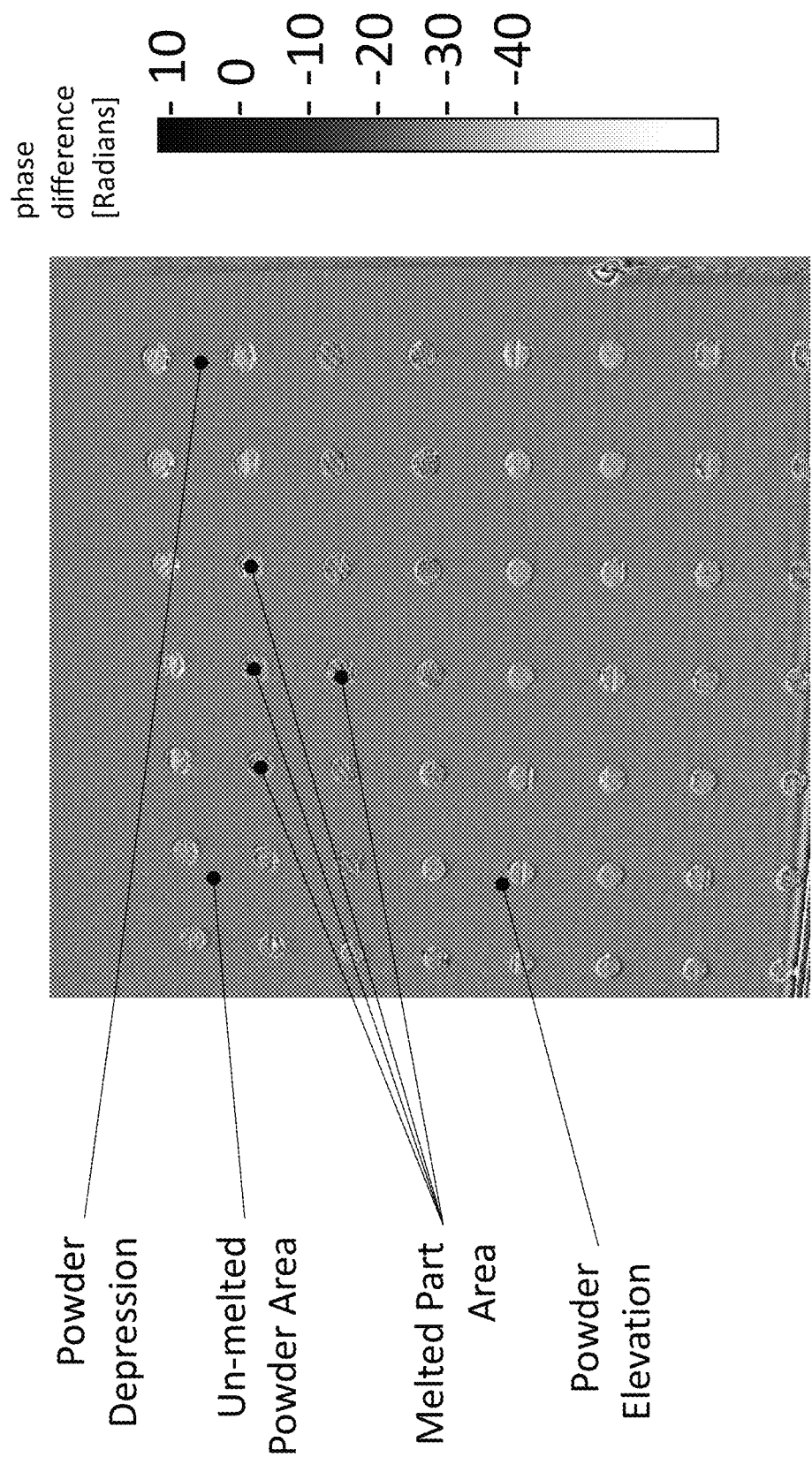
FIG. 10 is a Greyscale 3D Point Cloud of Phase (Process L-PBF) graph showing the phasemap difference Based Analysis, Post Melt Phasemap (Layer 56) MINUS Next Powder Layer Phasemap (Layer 57); the General features observed include the Phase difference between melted and powder layers; and the anomalies/defects observed include powder depressions and elevations.

FIG. 10 is a Greyscale 3D Point Cloud of Phase (Process L-PBF) graph showing the phasemap difference Based Analysis, Post Melt Phasemap (Layer 56) MINUS Next Powder Layer Phasemap (Layer 57); the General features observed include the Phase difference between melted and powder layers; and the anomalies/defects observed include powder depressions and elevations.

Figure 11:
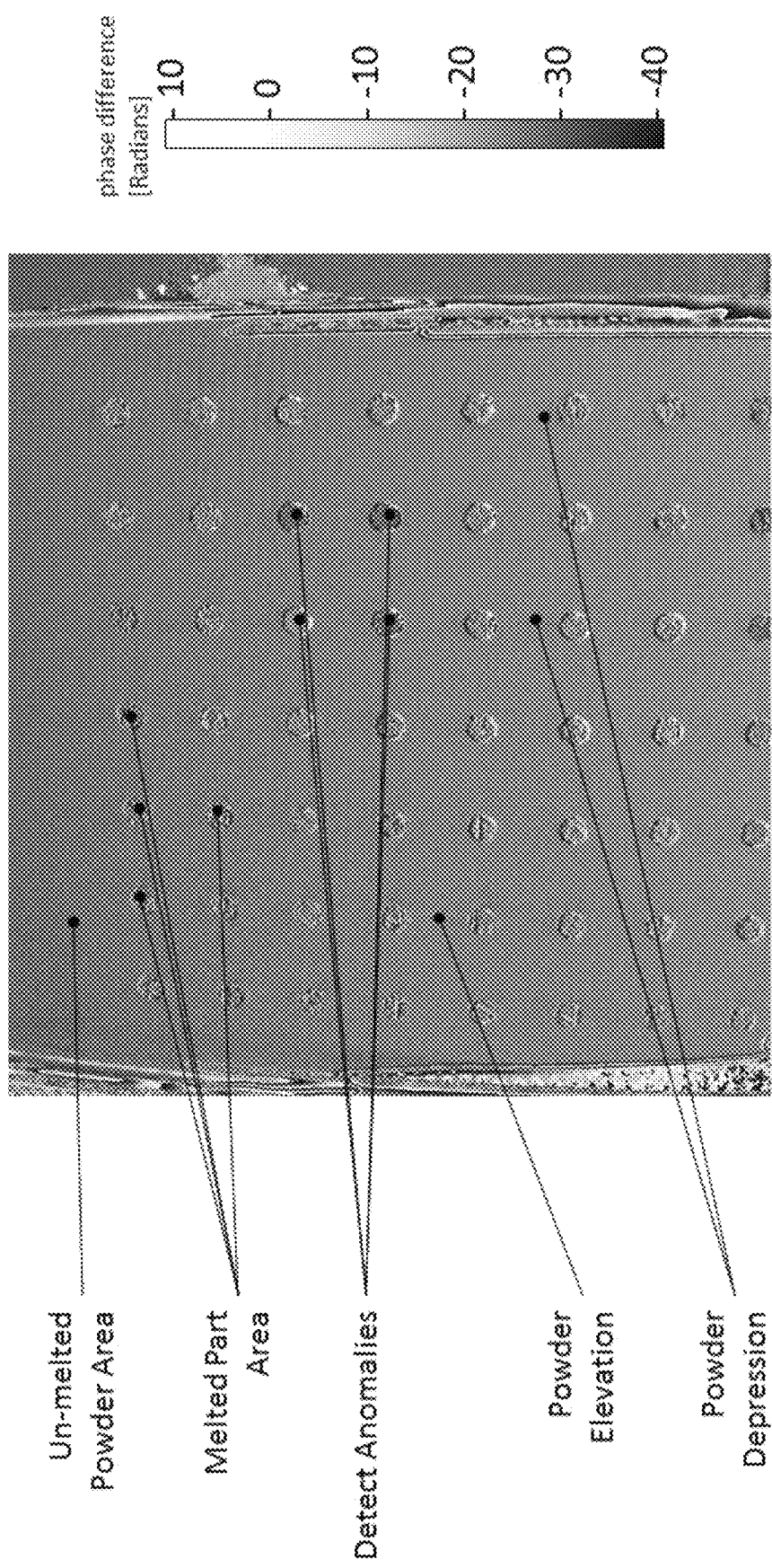
FIG. 11 is a Greyscale 3D Point Cloud of Phase (Process L-PBF) graph showing the Phasemap difference Based Analysis, Powder Layer Phasemap (Layer 55) MINUS Post Melt Phasemap (Layer 56); the general features observed include: Phase difference between powder layer and next melted layer; the anomalies/defects observed include: powder depressions and elevations detection anomalies.

FIG. 11 is a Greyscale 3D Point Cloud of Phase (Process L-PBF) graph showing the Phasemap difference Based Analysis, Powder Layer Phasemap (Layer 55) MINUS Post Melt Phasemap (Layer 56); the general features observed include: Phase difference between powder layer and next melted layer; the anomalies/defects observed include: powder depressions and elevations detection anomalies.

Figure 12:
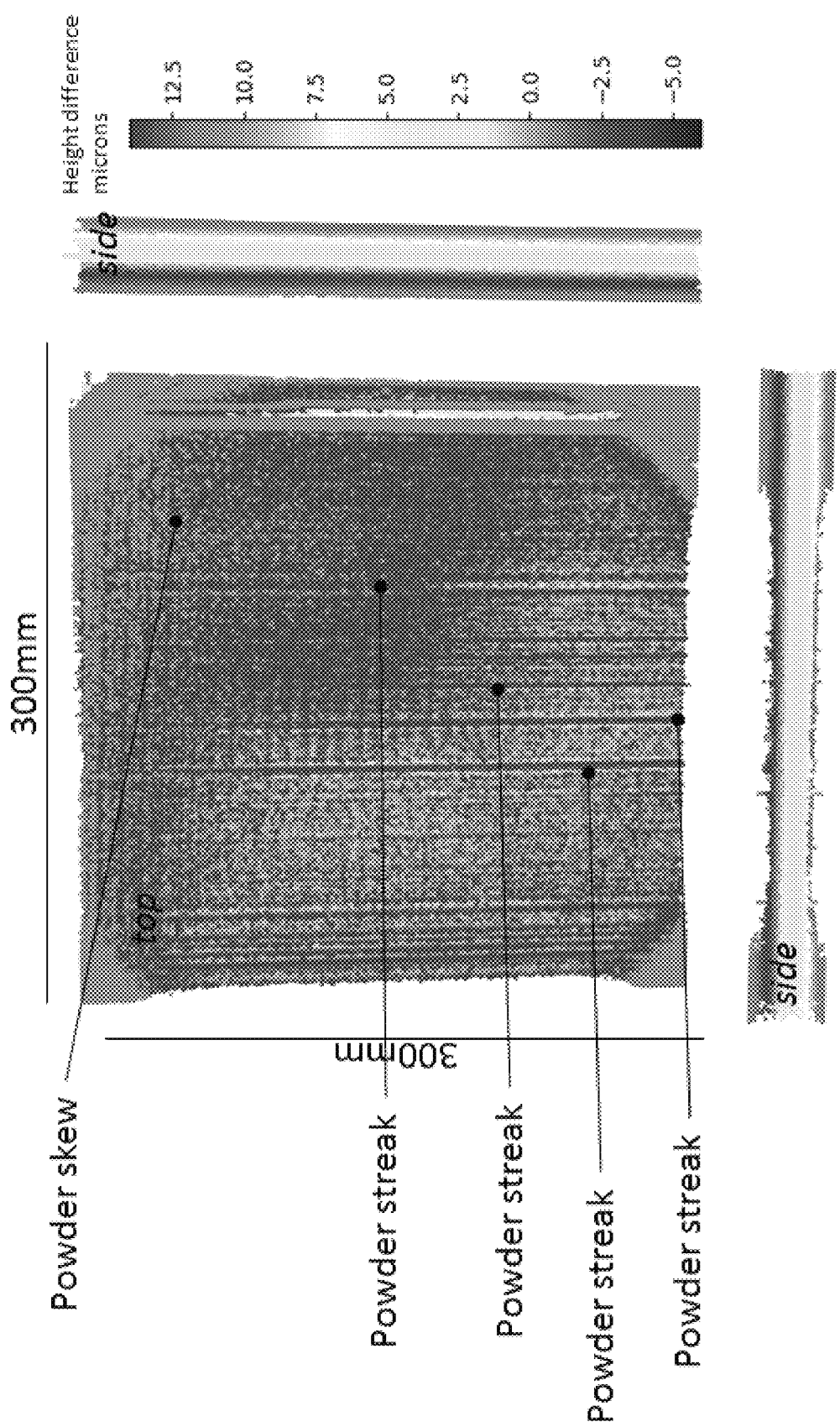
FIG. 12 is a Coloured 3D Point Cloud (Process L-PBF) graph showing the Typical

FIG. 12 is a Coloured 3D Point Cloud (Process L-PBF) graph showing the Typical Heightmap from Fringe Projection Taken after powder spreading, before melting; the general features observed include: Powder streaking, powder skew, non-even powder distribution.

is a Coloured 3D Point Cloud (Process L-PBF) graph showing the Typical Heightmap from Fringe Projection Taken after melting; the general features include: Powder streaking, powder skew, non-even powder distribution, thermal deformation, melted area, protrusions.

FIGS. 14A-14B are graphs showing the Typical Heightmap from Fringe Projection of powder bed lowered to −50 microns; and the general features include: 3D measurement of powder layer at bed level −50 microns; FIG. 14A shows the heightmap of the powder bed. FIG. 14B shows the cross section of the heightmap. (Process L-PBF).

FIGS. 15A-15B are graphs showing the Typical Heightmap from Fringe Projection of powder bed raised to +50 microns; FIG. 15A shows the heightmap of the powder bed; FIG. 15B shows the cross section of the heightmap. (Process L-PBF); and the features observed include: 3D measurement of powder layer at bed level +50 microns.

FIG. 16A is a graph showing the heightmap of the powder bed of the Visual image of binder jetting process after binder deposition; FIG. 16B is a graph showing the cross section of the heightmap. (Process Binder Jetting) for a Typical phasemap from Fringe Projection after binder deposition; the features observed include: Recoater roller powder anomalies, binder powder interaction, binder streaking, elevations, surface depressions.

FIG. 17 is a schematic flow chart showing the Training of neural network and gaussian process regression on heightmap. Training of the GPR model. To construct training data, in-situ data is position-matched with the greyscale of the CT image, creating "input-output pairs". To avoid significant computational overheads, this training data is then split between an ensemble of K GPR models.

FIG. 18 is a schematic flow chart showing the Operation of neural network and gaussian process regression on heightmap; the features include: Predictions using the GPR model. In-situ measurements are taken during a build and fed into the ensemble of GPR models. The predictions made by each GPR model are then combined to realize grey-scale values, forming an AI-generated predictor of porosity.

FIG. 19 is a CT scan for the Ground truth verification of printed specimen including the Training data collection example for gaussian process regression and neural network training; and the features include Low density area, potential pore location.

FIG. 20 is a CT scan for the Ground truth verification of printed specimen including Training data collection example for gaussian process regression and neural network training; and the features include: Low density area, potential pore location.

FIG. 21 is a CT scan for the Ground truth verification of printed specimen including Training data collection example for gaussian process regression and neural network training; features include: Low density area, potential pore location, Low density areas identified with AI/ML.

FIG. 22 is a CT scan Ground truth verification of printed specimen including Training data collection example for gaussian process regression and neural network training; features include: Low density area, potential pore location, Low density areas identified with AI/ML.

FIG. 23A is a graph showing the Print anomalies observed using heightmapping (difference between powder and melted) layer 567; FIG. 23B is a graph showing the Low density areas identified with AI/ML, Slice 567; In situ data and AI/ML and gaussian process regression prediction testing of low density and/or porosity locations; and features include: Low density area, potential pore location, Low density areas identified with AI/ML.

FIG. 24A is a In situ data of low density and/or porosity locations graph showing the Print anomalies observed using height mapping (difference between powder and melted) layer 567; FIG. 24B is an AI/ML and gaussian process regression prediction testing of low density and/or porosity locations graph showing the Low density areas identified with AI/ML, Slice 567; features include: low density area, potential pore location, Low density areas identified with AI/ML.

FIG. 25 is a system diagram of the monitoring system including the Hardware/software elements.

FIG. 26 is a photo of the monitoring system attached to printer (laser powder bed fusion) showing the System setup.

FIG. 27 is a photo showing the fringe pattern on powderbed; and the features include: powder area, fringe pattern.

FIG. 28 is a photo showing the fringe pattern on powderbed (2); and the features include: Melted area, powder area, fringe pattern.

FIG. 29A is photograph showing the camera system. Camera mounted on EOS M 290 Powder Bed Fusion 3D printer; FIG. 29B is a photograph showing the projector system. Projector mounted on EOS M 290 Powder Bed Fusion 3D printer.

FIG. 30 is a photograph showing the camera system. Camera mounted on exone innovent binder jetting 3d printer and the projector system. Projector mounted on exone innovent binder jetting 3d printer.

System

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Software includes applications and algorithms. Software may be implemented in a smart phone, tablet, or personal computer, in the cloud, on a wearable device, or other computing or processing device. Software may include logs, journals, tables, games, recordings, communications, SMS messages, Web sites, charts, interactive tools, social networks, VOIP (Voice Over Internet Protocol), e-mails, and videos.

In some embodiments, some or all of the functions or process(es) described herein and performed by a computer program that is formed from computer readable program code and that is embodied in a computer readable medium. The phrase "computer readable program code" includes any type of computer code, including source code, object code, executable code, firmware, software, etc. The phrase "computer readable medium" includes any type of medium capable of being accessed by a computer, such as read only memory (ROM), random access memory (RAM), a hard disk drive, a compact disc (CD), a digital video disc (DVD), or any other type of memory.

While the invention has been described in connection with various embodiments, it will be understood that the invention is capable of further modifications. This application is intended to cover any variations, uses or adaptations of the invention following, in general, the principles of the invention, and including such departures from the present disclosure as, within the known and customary practice within the art to which the invention pertains.

What is claimed is:

1. A method of detecting print defects in additive manufacturing, comprising:
   a. capturing an image of at least a portion of a surface of an object with a camera and a projection system;
   b. obtaining the surface of the object in real-time by a height map by projecting a pattern; and
   c. detecting print defects of the surface in a powder layer or a newly solidified layer using the obtained height-map.

2. The method of claim 1, further comprising evaluating the solidified layer based in melted, sintered, or binded solidification.

3. The method of claim 1, further comprising using the difference in height between the newly solidified layer and the previous powder layer to find print defects.

4. The method of claim 1, further comprising using the difference in height between the solid layer and the next powder layer to find print defects.

5. The method of claim 1, further comprising using the measured print defects to find a part defect through the use of linear regression, signal processing, anomaly counting artificial intelligence, finite element modeling, convolutional neural networks, or other.

6. The method of claim 5, wherein the part defects include density defects, porosity defects, metallurgical defects, lack-of-fusion, cracking, deformation, or dimensional defects.

7. The method of claim 1, wherein the print defects includes warping, over-melting, under-melting, thermal deformation, lack-of-fusion, powder short feeding, non-uniform powder coating, recoater blade hopping, powder streaks, powder depressions, part protrusions, recoater blade defects, or build plate skew, recoater cross sectional information, build surface skew, plate skew, build plate flatness, build plate vibration, build plate vertical accuracy, powder coating thickness, powder coating roughness, powder coating streaking, powder coating hopping, powder coating short feeds, powder coating clumps, powder coating agglomerations, changes in powder coating after melting or solidification or binding, non-uniform powder particles, thermal deformation, component protrusions, absolute layer height from a reference, material disintegration, support structure strain, overall strain, surface strain, particle spitting, particle aggregation, particle agglomeration, uneven melting, uneven sintering, laser spacing effects, laser spot size, laser power, binder ballistic effect, binder powder interaction, binder deposition height solidification, or any other physical phenomena.

8. A method of detecting print defects in an additive manufacturing process, comprising:
   a. capturing an image of at least a portion of a surface of an object with a camera and a projection system;
   b. using the image of at least a portion of a surface of the object with an illumination system to encode a spatial value to each part of the image during the additive manufacturing process; and
   c. using the spatial value to estimate an encoded spatial phase uniformity of a powder layer or a newly solidified layer to find print defects.

9. The method of claim 8, further comprising evaluating the solidified layer based in melted, sintered, or binded solidification.

10. The method of claim 8, further comprising using the difference in spatial phase between the newly solidified layer and the previous powder layer to find print defects.

11. The method of claim 8, further comprising using the difference in spatial phase between the solid layer and the next powder layer to find print defects.

12. The method of claim 8, further comprising using the measured print defects to find a part defect through the use of linear regression, signal processing, anomaly counting artificial intelligence, finite element modeling, convolutional neural networks, or other.

13. The method of claim 12, wherein the part defects include density defects, porosity defects, metallurgical defects, lack-of-fusion, cracking, deformation, or dimensional defects.

14. The method of claim 8, wherein the print defects includes warping, over-melting, under-melting, thermal deformation, lack-of-fusion, powder short feeding, non-uniform powder coating, recoater blade hopping, powder streaks, powder depressions, part protrusions, recoater blade defects, or build plate skew, recoater cross sectional information, build surface skew, plate skew, build plate flatness, build plate vibration, build plate vertical accuracy, powder coating thickness, powder coating roughness, powder coating streaking, powder coating hopping, powder coating short feeds, powder coating clumps, powder coating agglomerations, changes in powder coating after melting or solidification or binding, non-uniform powder particles, thermal deformation, component protrusions, absolute layer height from a reference, material disintegration, support structure strain, overall strain, surface strain, particle spitting, particle aggregation, particle agglomeration, uneven melting, uneven sintering, laser spacing effects, laser spot size, laser power, binder ballistic effect, binder powder interaction, binder deposition height solidification, or any other physical phenomena.

\* \* \* \* \*

UNITED STATES PATENT AND TRADEMARK OFFICE
CERTIFICATE OF CORRECTION

| | | |
|---|---|---|
| PATENT NO. | : 11,865,613 B2 | Page 1 of 1 |
| APPLICATION NO. | : 18/299508 | |
| DATED | : January 9, 2024 | |
| INVENTOR(S) | : Niall O'Dowd and Christopher John Sutcliffe | |

It is certified that error appears in the above-identified patent and that said Letters Patent is hereby corrected as shown below:

In the Specification

In Column 1, after Line 13 and before "BACKGROUND" kindly insert, therefor:
--STATEMENT REGARDING FEDERALLY SPONSORED RESEARCH OR DEVELOPMENT
The invention described herein was made with U.S. government ("Government") support under Contract No. FA864922P0933, awarded by the U.S. Air Force. As a result, the Government has certain rights in this invention.--

Signed and Sealed this
Twenty-sixth Day of November, 2024

*Katherine Kelly Vidal*

Katherine Kelly Vidal
*Director of the United States Patent and Trademark Office*